(12) United States Patent
Kondo

(10) Patent No.: US 10,857,791 B2
(45) Date of Patent: Dec. 8, 2020

(54) PRINT HEAD

(71) Applicant: Seiko Epson Corporation, Tokyo (JP)

(72) Inventor: Yoichiro Kondo, Chino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/261,002

(22) Filed: Jan. 29, 2019

(65) Prior Publication Data

US 2019/0232655 A1     Aug. 1, 2019

(30) Foreign Application Priority Data

Jan. 31, 2018   (JP) .................. 2018-015782

(51) Int. Cl.
| | |
|---|---|
| *B41J 2/14* | (2006.01) |
| *B41J 2/155* | (2006.01) |
| *C09D 11/322* | (2014.01) |
| *B41J 2/045* | (2006.01) |
| *B41J 2/16* | (2006.01) |

(52) U.S. Cl.
CPC ....... *B41J 2/14209* (2013.01); *B41J 2/04563* (2013.01); *B41J 2/04581* (2013.01); *B41J 2/14233* (2013.01); *B41J 2/155* (2013.01); *B41J 2/161* (2013.01); *B41J 2/1623* (2013.01); *B41J 2/1626* (2013.01); *B41J 2/1631* (2013.01); *C09D 11/322* (2013.01); *B41J 2002/14362* (2013.01); *B41J 2002/14491* (2013.01)

(58) Field of Classification Search
CPC .. B41J 2/1623; B41J 2/14233; B41J 2/14072; B41J 2/161; B41J 2202/20; B41J 2202/14419; B41J 2202/14362
See application file for complete search history.

(56) References Cited

U.S. PATENT DOCUMENTS

| | | | | |
|---|---|---|---|---|
| 7,055,936 | B2 * | 6/2006 | Imai | B23K 1/0016 347/58 |
| 2001/0033313 | A1 * | 10/2001 | Ohno | B41J 2/1404 347/68 |
| 2005/0231575 | A1 * | 10/2005 | Bannai | B41J 2/14274 347/100 |
| 2008/0239010 | A1 * | 10/2008 | Tomita | B41J 2/14072 347/58 |
| 2008/0239021 | A1 * | 10/2008 | Watanabe | B41J 2/14209 347/70 |
| 2010/0103634 | A1 * | 4/2010 | Funaya | H05K 1/185 361/761 |
| 2010/0182367 | A1 * | 7/2010 | Takagi | B41J 2/145 347/14 |
| 2013/0038664 | A1 | 2/2013 | Kagata et al. | |

(Continued)

FOREIGN PATENT DOCUMENTS

JP        5861815 B2      2/2016

*Primary Examiner* — John Zimmermann
(74) *Attorney, Agent, or Firm* — Harness, Dickey & Pierce, P.L.C.

(57) ABSTRACT

A print head includes a first substrate having 600 or more piezoelectric elements aligned at a density of 300 or more per inch for ejecting liquid, a second substrate, and a flexible wiring substrate that connects the first substrate and the second substrate, in which the flexible wiring substrate is a multilayer substrate in which a conductive metal and a nonconductive resin are laminated and the nonconductive resin is pressure bonded.

8 Claims, 15 Drawing Sheets

(56) References Cited

U.S. PATENT DOCUMENTS

| | | | |
|---|---|---|---|
| 2013/0100212 A1* | 4/2013 | Redding | B41J 2/14233 347/71 |
| 2015/0109369 A1* | 4/2015 | Nagata | B41J 2/14072 347/54 |
| 2015/0231879 A1* | 8/2015 | Furukawa | B41J 2/14233 347/44 |
| 2016/0207311 A1* | 7/2016 | Tamai | B41J 2/1433 |
| 2018/0185658 A1* | 7/2018 | Blood | A61N 1/37258 |

* cited by examiner

FIG. 7
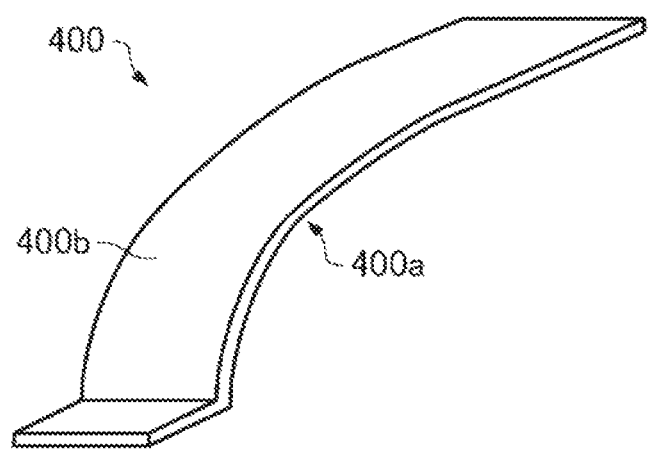
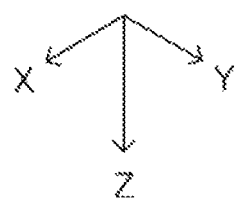

BATCH PRESS

COMPLETION

PRIMARY LAMINATION

SECONDARY LAMINATION

COMPLETION

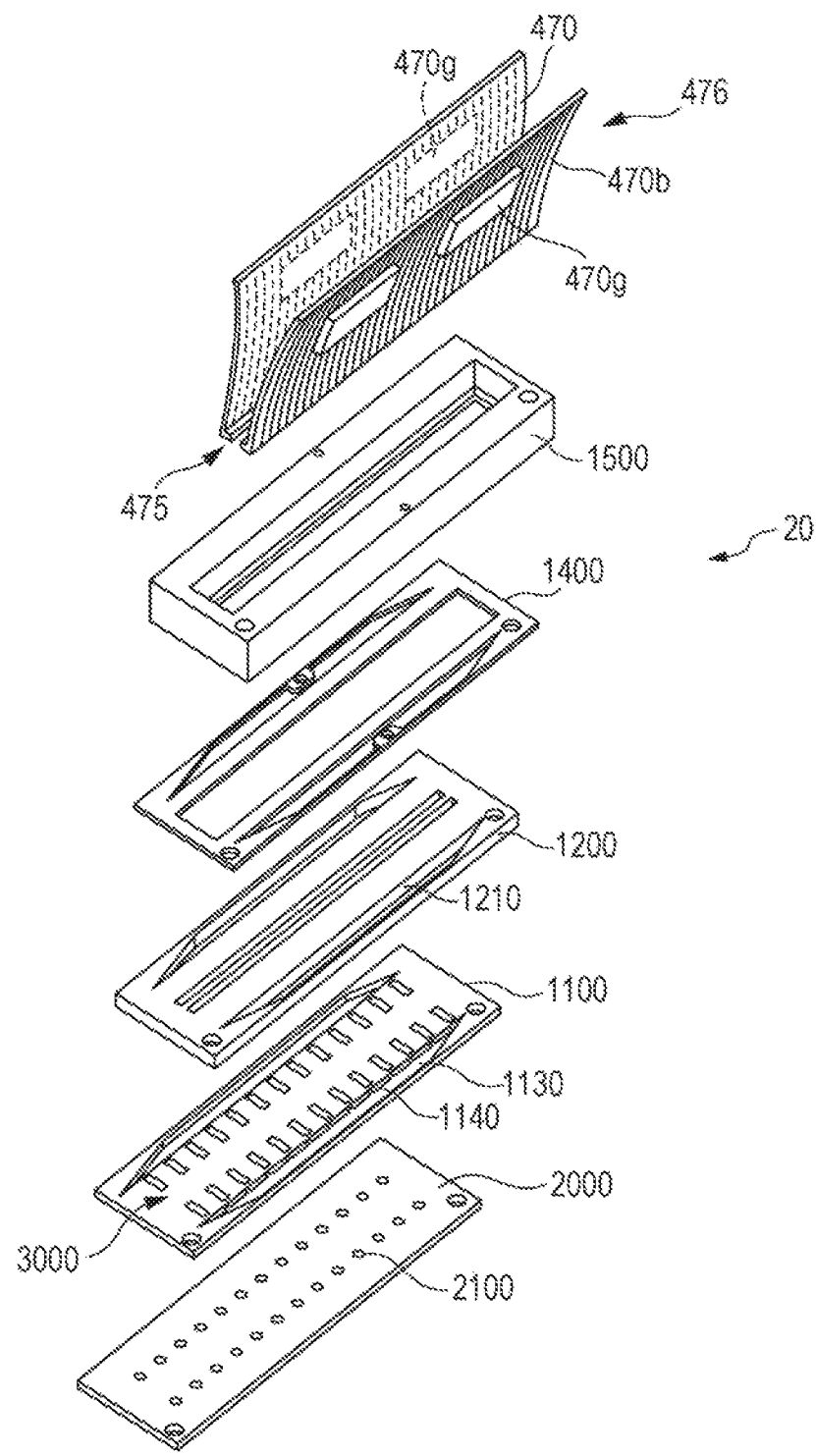

PRINT HEAD

This application claims priority to Japanese Patent Application No. 2018-015782 filed on Jan. 31, 2018. The entire disclosure of Japanese Patent Application No. 2018-015782 is hereby incorporated herein by reference.

BACKGROUND

1. Technical Field

The present invention relates to a print head, for example.

2. Related Art

An ink jet printer using a piezoelectric element (for example, a piezo element) is known as an ink jet printer that ejects an ink to print images, documents, and the like. Piezoelectric elements corresponding to each of a plurality of nozzles in a print head are provided, and each of them is driven according to a drive signal, whereby a predetermined amount of liquid (ink) is ejected from the nozzles at a predetermined timing to form dots. Since the piezoelectric element is electrically a capacitive load like a capacitor, it is necessary to supply sufficient current to operate the piezoelectric element of each nozzle.

Japanese Patent No. 5861815 discloses a print head in which 300 or more nozzles are arranged in parallel per inch and piezoelectric elements are provided correspondingly to each of these nozzles.

SUMMARY

An advantage of some aspects of the invention is to increase the density of wiring for supplying drive signals to each of the piezoelectric elements in a print head with an increased nozzle density in accordance with the densification of nozzles. This advantage is particularly noticeable in a print head in which 300 or more nozzles are aligned in rows per inch over a length of one inch or more.

According to an aspect of the invention, a print head includes a drive module having 600 or more piezoelectric elements aligned at a density of 300 or more per inch for ejecting liquid, and a first substrate, a second substrate, and a flexible wiring substrate connecting the first substrate and the second substrate, in which the flexible wiring substrate is a multilayer substrate in which a conductive metal and a nonconductive resin are laminated and the nonconductive resin is pressure bonded.

In the print head according to this configuration, the reaction force at a time of bending the flexible wiring substrate is reduced, and the shape at a time of bending is maintained, which allows ease of assembling with high accuracy. In addition, it is possible to enhance the waveform accuracy and the like of the drive signal supplied to the piezoelectric elements. Therefore, with the print head according to one embodiment, densification of the wiring is facilitated, which facilitates densification such as 600 or more piezoelectric elements aligned at a density of 300 or more per inch.

In the print head, it is preferable that the flexible wiring substrate be formed by laminating the conductive metal and the nonconductive resin without using an adhesive. According to this configuration, the deterioration of the adhesive due to the influence of the ejection of the liquid can be suppressed. In addition, since there is no adhesive layer, good high-frequency characteristics can be ensured, and thinning and thickness uniformity can be achieved.

In the print head, it is preferable that the flexible wiring substrate be a multilayer substrate in which the nonconductive resin is pressure bonded by heat. According to this configuration, corrosion of the conductive metal and influence from the ejected liquid are reduced, which allows use in a wide range of applications.

In the print head, it is preferable that the liquid be a reactive ink. The influence of the mist caused by the ejection of the reactive ink is inhibited, so that various types of reactive inks can be used, while various kinds of media can be used to receive the ejected ink. The reactive ink will be described below.

In the print head, it is preferable that the flexible wiring substrate connect the first substrate and the second substrate in a bent state. According to this configuration, it allows thinner thickness than a general related art flexible wiring substrate using polyimide, and the reaction force at a time of bending can be reduced and fine bending is obtained, so that the density of the print head can be increased.

In the print head, it is preferable that the flexible wiring substrate be bent a plurality of times.

According to this configuration, it is possible to easily have bending a plurality of times. Therefore, the first substrate and the second substrate are easily connected three-dimensionally through the flexible wiring substrate, so that the density of the print head can be increased.

In the print head, it is preferable that the first substrate include a temperature sensor, and that the flexible wiring substrate transmit information of the temperature sensor to the second substrate. According to this configuration, the influence of the inductance and the like occurring in the flexible wiring substrate is reduced, so that the temperature information detected by the temperature sensor can be accurately transmitted.

In the print head, it is preferable that the second substrate supply electric power for driving the piezoelectric element and that the flexible wiring substrate transmit the electric power.

In the flexible wiring substrate applied to the print head, a thinner thickness is allowed and a reaction force at a time of bending and the like is reduced compared to a related wiring substrate using polyimide, so that it is possible to assemble a high-density print head using a bendable flexible wiring substrate with high accuracy. Further, since variation in the wiring resistance at a junction of the flexible wiring substrate is reduced, the accuracy of the electric signal supplied to each piezoelectric element is enhanced, and it is possible to perform high-precision printing. Furthermore, in the high-density print head, while an amount of current increases due to increase in the number of piezoelectric elements, a corresponding number of wires (conductor sectional area) can be ensured to cope with the large current.

In the print head according to the embodiment, it is preferable that the drive module include an ejection section including a pressure chamber and a nozzle provided corresponding to each of the piezoelectric elements, that the pressure of the pressure chamber change as the piezoelectric element is driven, and the nozzle be an opening formed in a nozzle plate formed of silicon crystal. According to this configuration, since the positional deviation of the nozzles is reduced, the density of the nozzles in the print head can be increased. The flexible wiring substrate is particularly effective in such a high-density print head.

BRIEF DESCRIPTION OF THE DRAWINGS

The invention will be described with reference to the accompanying drawings, wherein like numbers reference like elements.

FIG. 7 is a perspective view showing a flexible wiring substrate.

FIG. 17 is an exploded perspective view showing a configuration of a drive module in a print head.

DESCRIPTION OF EXEMPLARY EMBODIMENTS

Hereinafter, embodiments for carrying out the invention will be described with reference to the drawings. In each figure, the dimensions and scale of each part may be different from the actual one. In addition, since the embodiments described below are preferable specific examples of the invention, various technically preferable limitations are given, but, in the description below, the scope of the invention is not limited to these forms unless otherwise stated to limit the invention.

Figure 1:
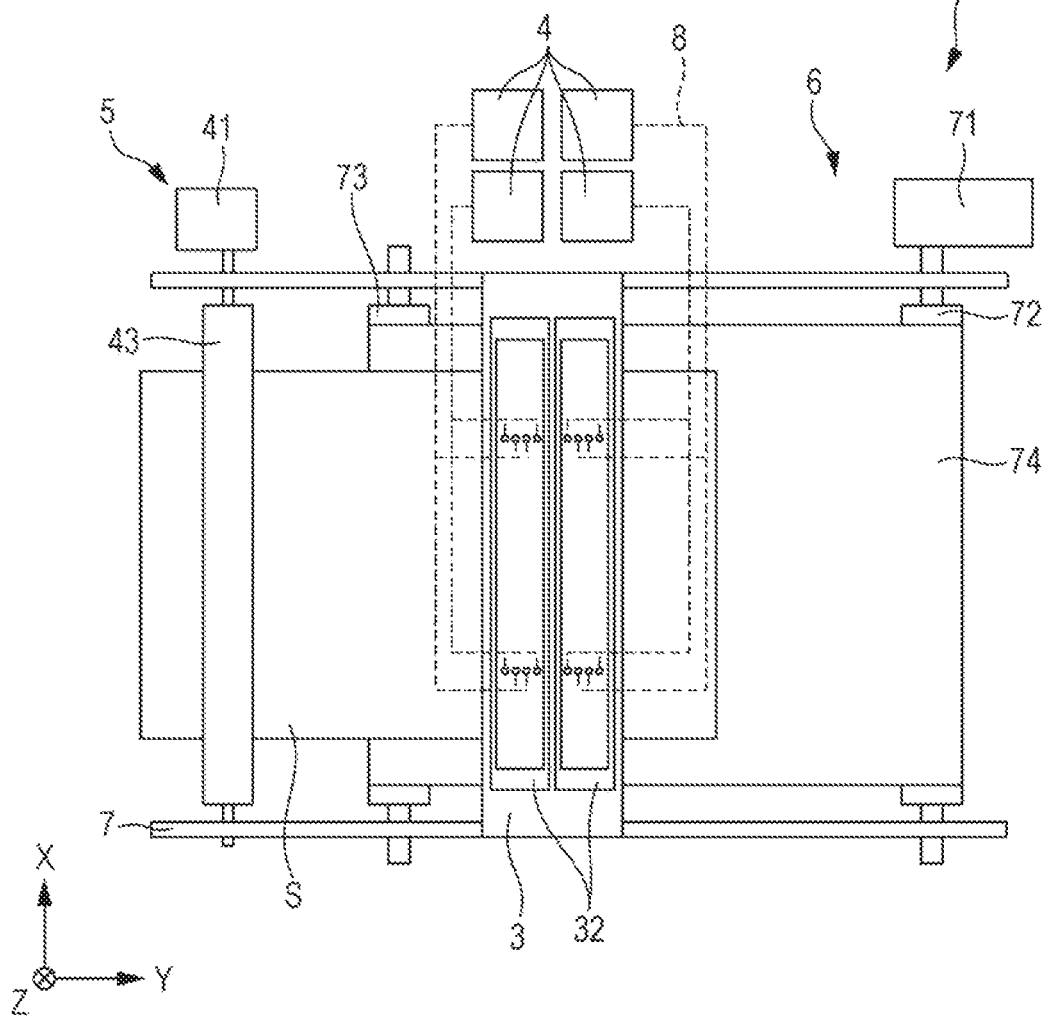
FIG. 1 is a plan view showing a schematic configuration of a liquid ejecting apparatus according to a first embodiment.
Figure 2:
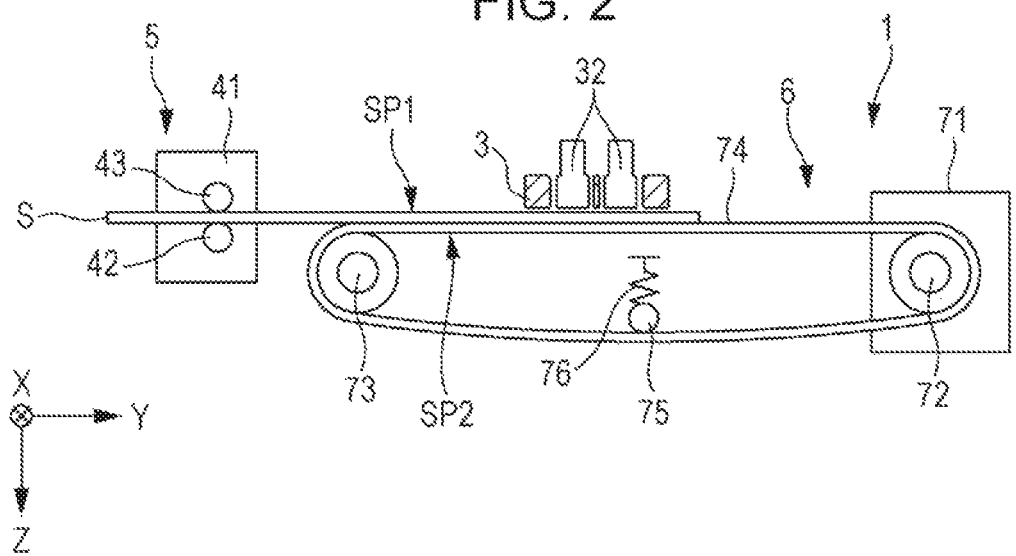
FIG. 2 is a side view showing a schematic configuration of a liquid ejecting apparatus.

FIG. 1 is a plan view schematically showing a liquid ejecting apparatus 1 according to a first embodiment, and FIG. 2 is a side view of the liquid ejecting apparatus 1.

The liquid ejecting apparatus 1 according to the present embodiment is a so-called line head type ink jet printer that ejects the ink (which is an example of "liquid") in accordance with image data supplied from an external host computer to form a group of ink dots while transporting a printing medium such as paper or textile, thus printing an image (including letters, figures and the like) corresponding to the image data.

A width direction (direction from the bottom to the top in FIG. 1) of the liquid ejecting apparatus 1 is referred to as an "X direction" and the direction from a first driven roller 43 to a second transport roller 72 is referred to as a "Y direction". In addition, a height direction of the liquid ejecting apparatus 1 (direction perpendicular to the paper in FIG. 1), which intersects both the X direction and the Y direction, is referred to as a "Z direction".

In the present embodiment, the X direction, the Y direction, and the Z direction are orthogonal to each other, but are not limited to such example, and the arrangement of respective components may not be necessarily orthogonal.

The liquid ejecting apparatus 1 includes a plurality of print heads 32, a base 3 on which the print heads 32 are mounted, a liquid storage 4 such as an ink tank that stores the ink, a first transport section 5, a second transport section 6, and an apparatus main body (casing) 7.

In this embodiment, a reactive ink as described below can also be used as the ink.

Figure 3:
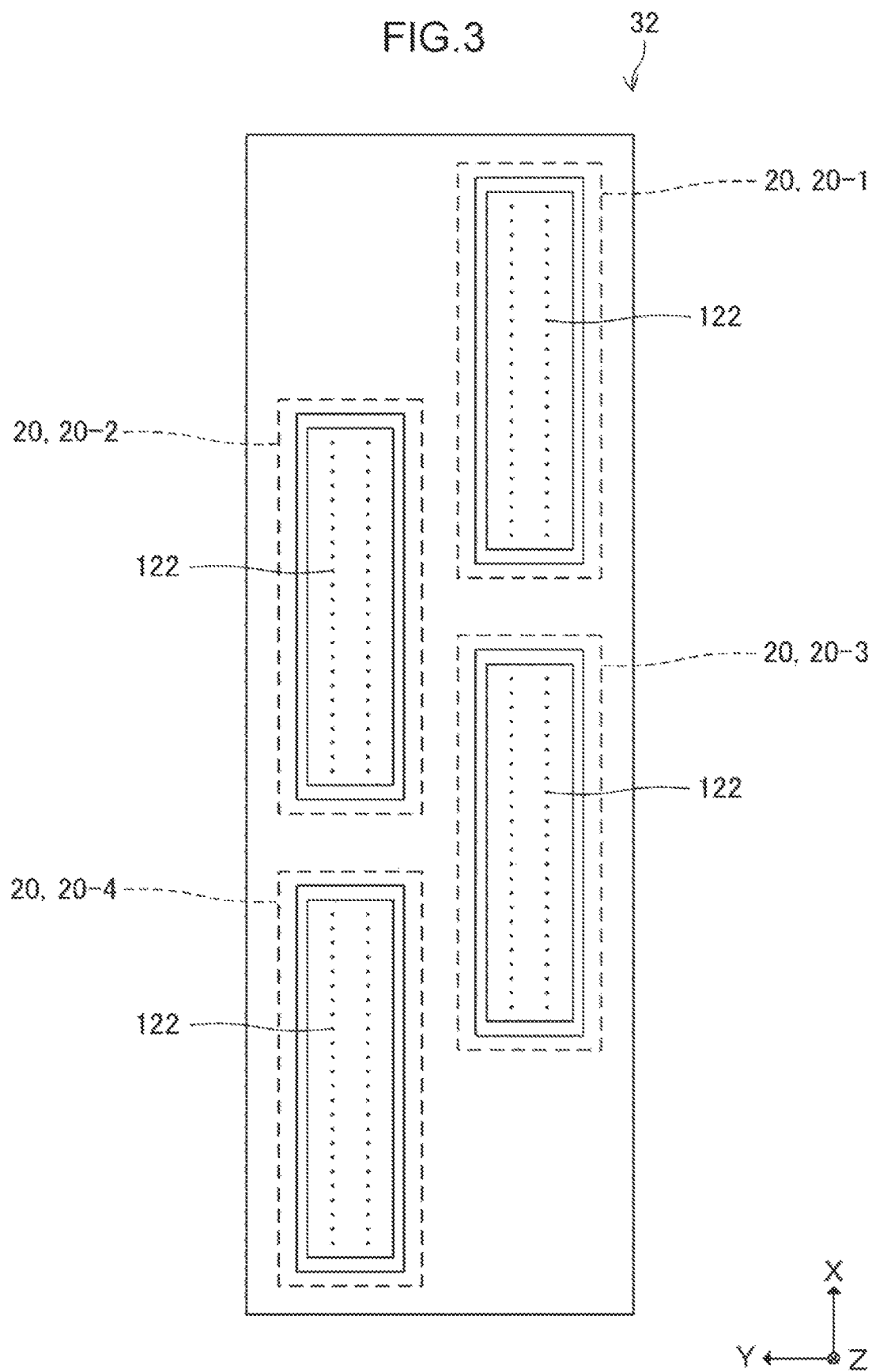
FIG. 3 is a plan view for explaining a nozzle surface of a print head in a liquid ejecting apparatus.

In the print head 32, as shown in FIG. 3, a plurality of drive modules 20 (20-1 to 20-4) are aligned in the X direction intersecting with the transport direction of medium S which is an object on which image is formed. When one of the drive modules is specifically described, the drive module will be denoted by numeral "20" followed by a number attached to a hyphen, while when the drive modules are generally described rather than specifying any one, they will be simply denoted to by numeral "20".

The medium S is typically paper, film, cloth or the like. In addition, on a surface of each of the drive modules 20 that faces the medium S in the Z direction, a multiplicity of nozzles 122 for ejecting the ink are provided in the drive module 20, which are aligned at predetermined intervals in the X direction. As will be described below, one piezoelectric element 60 (see FIG. 4) for ejecting liquid is provided for each of the nozzles 122.

In particular, the drive module 20 according to the present embodiment has 400 or more nozzles 122, or in this example, 600 or more nozzles 122 (piezoelectric elements 60) aligned at a density of 300 or more per inch. Specifically, a total of 600 or more nozzles are provided in two nozzle rows with nozzles at a density of 300 or more per inch in each of the two nozzle rows, in which the nozzle row is in a length of 1 inch or more.

In this way, 300 or more nozzles 122 (piezoelectric element 60) may be provided in each of the nozzle rows, respectively, and the drive module 20 may have only one row of nozzles provided with 600 or more nozzles 122 (piezoelectric elements 60).

In addition, FIG. 3 virtually shows the positions of the drive modules 20 and the nozzles 122 when the print head 32 is viewed from the Z direction. The positions of the nozzles 122 at the ends of the drive modules 20 (for example, the drive module 20-1 and the drive module 20-2) adjacent in the Y direction at least partly overlap. In addition, the nozzles 122 are aligned at predetermined intervals in the X direction over the width of the medium S or more in the direction X. That is, the print head 32 causes the nozzles 122 to eject the ink onto the medium S transported under the print head 32 without stopping, so that the liquid ejecting apparatus 1 prints on the medium S.

In FIG. 3, the number of the drive modules 20 included in one print head 32 is "4" (drive modules 20-1 to 20-4) for convenience of illustration, but the number is not limited to "4". That is, the number of the drive modules 20 may be more or less than 4. In addition, while the drive modules 20 in FIG. 3 are aligned in a zigzag grid form, the embodiment is not limited to this arrangement.

Returning to FIGS. 1 and 2, the base 3 includes two print heads 32 juxtaposed in the Y direction.

The liquid storage 4 supplies the ink to the print head 32. In the present embodiment, the liquid storage 4 is fixed to the apparatus main body 7 and the ink is supplied to the print head 32 from the liquid storage 4 through a supply pipe 8 such as a tube.

The first transport section 5 is provided on one side in the Y direction of the print head 32. The first transport section 5 includes a first transport roller 42 and the first driven roller 43 driven by the first transport roller 42. The first transport roller 42 is provided on a back surface SP2 side opposite to a landing surface SP1 of the medium S on which the ink is landed, and is driven by a first drive motor 41. In addition, the first driven roller 43 is provided on the landing surface SP1 side of the medium S, and pinches the medium S between itself and the first transport roller 42. The first driven roller 43 presses the medium S toward the first transport roller 42 by a biasing member such as a spring (not shown).

The second transport section 6 includes a second drive motor 71, a second transport roller 72, a second driven roller 73, a transport belt 74, and a tension roller 75.

The second transport roller 72 is driven by the second drive motor 71. The transport belt 74 is an endless belt and surrounds the outer circumferences of the second transport roller 72 and the second driven roller 73. Such a transport belt 74 is provided on the back surface SP2 side of the medium S. The tension roller 75 is provided between the second transport roller 72 and the second driven roller 73 and abuts against an inner circumferential surface of the transport belt 74 and applies a tension to the transport belt 74 by the biasing force of the biasing member 76 such as a spring. As a result, the surface of the transport belt 74 facing the print head 32 between the second transport roller 72 and the second driven roller 73 is flat.

In the liquid ejecting apparatus 1 of the present embodiment, the medium S is transported in the second direction Y by the first transport section 5 and the second transport section 6. In accordance with this transporting, the ink is ejected from the print head 32, and the ejected ink is landed on the landing surface SP1 of the medium S, whereby printing is performed.

Figure 4:
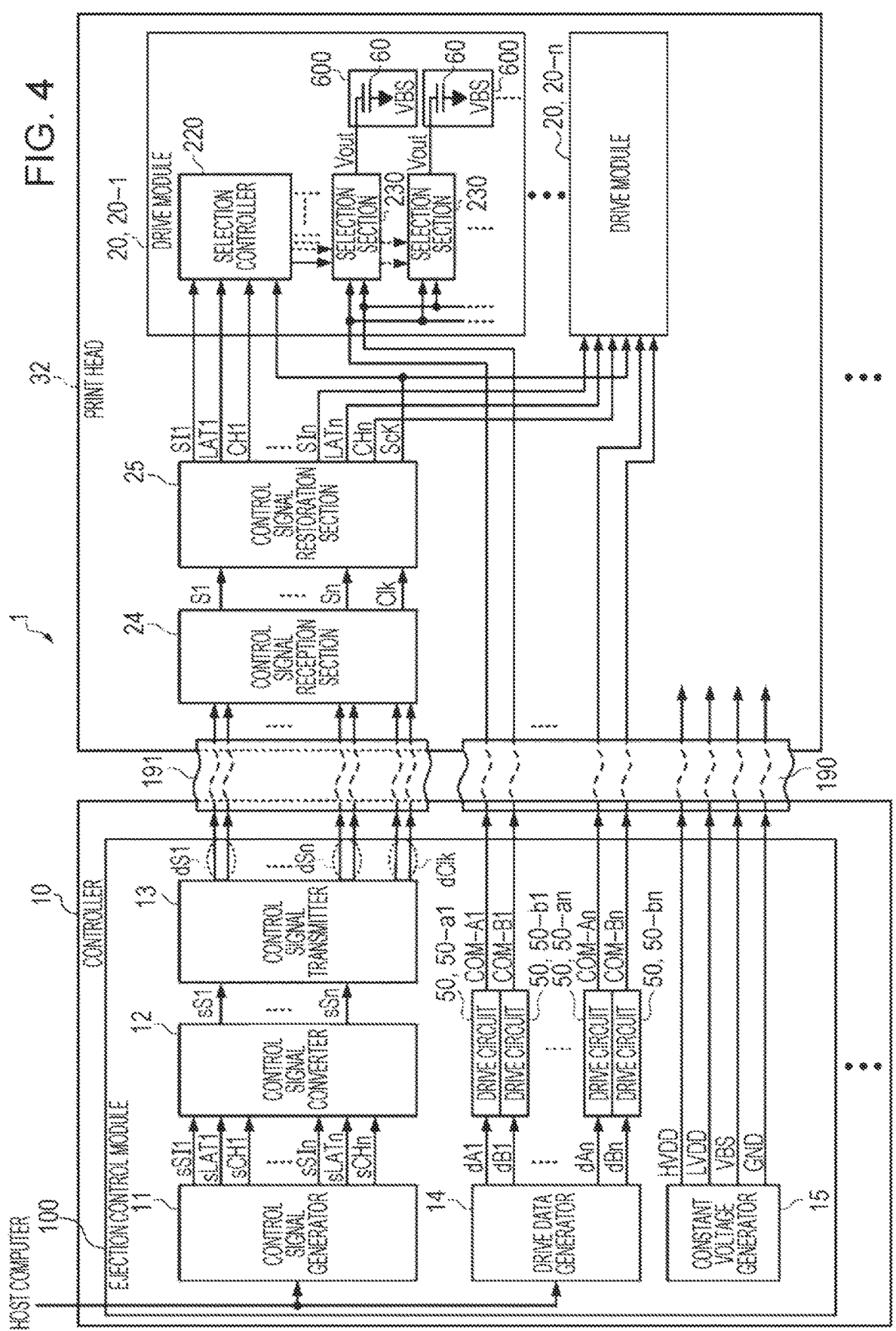
FIG. 4 is a block diagram showing an electrical configuration of a liquid ejecting apparatus.

FIG. 4 is a block diagram showing an electrical configuration of a liquid ejecting apparatus 1.

The embodiment will be described based on the assumption that the liquid ejecting apparatus 1 shown in FIG. 4 has N (N is an integer of 2 or more) print heads 32, and one print head 32 includes n (n is an integer of 2 or more) drive modules 20.

As shown in FIG. 4, the liquid ejecting apparatus 1 includes N print heads 32, a controller 10 that controls the ejection of liquid from each of the print heads 32, n flexible flat cables 190 and n flexible flat cables 191 for connecting the controller 10 to each of the print heads 32.

The controller 10 includes n ejection control modules 100. Each of the n ejection control modules 100 includes a control signal generator 11, a control signal converter 12, a control signal transmitter 13, a drive data generator 14, and a constant voltage generator 15.

When various signals such as image data are supplied from a host computer, the control signal generator 11 outputs various control signals and the like for controlling each section.

Specifically, the control signal generator 11 generates a plurality of types of original control signals for controlling the ejection of liquids from an ejection section 600, which include n pieces of original print data signals sSI1 to sSIn, n pieces of original latch signals sLAT1 to sLATn, and n pieces of original change signals sCH1 to sCHn, and outputs them to the control signal converter 12 in a parallel manner based on various signals from the host computer. A plurality of types of original control signals may not include some of these signals or may include other signals.

The control signal converter 12 converts the original print data signal sSIi (i is any one of 1 to n), the original latch signal sLATi, and the original change signal sCHi output from the control signal generator 11 into one original serial control signal sSi in serial form, respectively, and outputs the resultant signal to the control signal transmitter 13.

The control signal transmitter 13 converts the n original serial control signals sS1 to sSn output from the control signal converter 12 into differential signals dS1 to dSn each composed of two signals and transmits the differential signals dS1 to dSn to the print head 32 through a flexible flat cable 191. In addition, the control signal transmitter 13 generates a differential clock signal dClk used for high-speed serial data transmission of the differential signals dS1 to dSn through the flexible flat cable 191 and transmits the differential clock signal dClk to the print head 32 through the flexible flat cable 191. For example, the control signal transmitter 13 generates the differential signals dS1 to dSn and the differential clock signal dClk of the low voltage differential signaling (LVDS) transmit system and transmits the resultant signals to the print head 32. Since the amplitude of the differential signal of the LVDS transmit system is about 350 mV, high-speed data transmission can be realized. The control signal transmitter 13 may generate differential signals dS1 to dSn and differential clock signals dClk of various high-speed transmit systems such as LVDS, and also Low Voltage Positive Emitter Coupled Logic (LVPECL) and Current Mode Logic (CML), or the like and transmit the resultant signals to the print head 32.

The drive data generator 14 generates 2n drive data dA1 to dAn and dB1 to dBn, which are digital data as a source of the drive signal for driving the n drive modules 20 (20-1 to 20-n) included in the print head 32 based on various signals from the host computer.

In the present embodiment, the drive data dA1 to dAn and dB1 to dBn are digital data that define the amplitude of the drive signal. However, the drive data dA1 to dAn and dB1 to dBn may be digital data that indicates a difference with respect to the latest drive data, or may be digital data that defines a corresponding relationship between the lengths of respective sections with certain slopes in the drive waveform and the respective slopes.

The n drive circuits 50-$a$1 to 50-$a$n generate drive signals COM-A1 to COM-An for driving the drive modules 20-1 to 20-$n$ included in the print head 32, respectively, based on the drive data dA1 to dAn output from the drive data generator 14. Similarly, the n drive circuits 50-$b$1 to 50-$b$n generate drive signals COM-B1 to COM-Bn for driving the drive modules 20-1 to 20-$n$, respectively, based on the drive data dB1 to dBn output from the drive data generator 14. For example, the drive circuits 50-$a$1 to 50-$a$n and 50-$b$1 to 50-$b$n may generate the drive signals COM-A1 to COM-An and COM-B1 to COM-Bn by performing class-D amplification after analog-converting the drive data dA1 to dAn and dB1 to dBn, respectively. The 2n drive circuits 50 (50-a1 to 50-an and 50-b1 to 50-bn) may have the same circuit configuration, except that the drive data to be input and the drive signals to be output are different.

The constant-voltage generator 15 generates a high power voltage signal HVDD of a certain voltage (for example, 42 V), a low power voltage signal LVDD of a certain voltage (for example, 3.3 V), a reference voltage signal VBS of a certain voltage (for example, 6 V) and a ground voltage signal GND of a ground voltage (0 V). The control signal generator 11, the control signal converter 12, the control signal transmitter 13, and the drive data generator 14 are operated by a supply of the low power voltage signal LVDD and the ground voltage signal GND. In addition, the drive circuits 50-a1 to 50-an are operated by a supply of the high power voltage signal HVDD, the low power voltage signal LVDD, the reference voltage signal VBS, and the ground voltage signal GND.

The drive signals COM-A1 to COM-An and COM-B1 to COM-Bn, the high power voltage signal HVDD, the low power voltage signal LVDD, the reference voltage signal VBS, and the ground voltage signal GND are supplied to the print heads 32 through the flexible flat cable 190.

The controller 10 performs processing for driving the first drive motor 41 and the second drive motor 71 in addition to the processing described above. As a result, the medium S is transported in a predetermined direction.

The print head 32 includes n drive modules 20 (20-1 to 20-n), a control signal reception section 24, and a control signal restoration section 25. The control signal reception section 24 and the control signal restoration section 25 are operated by a supply of the low power voltage signal LVDD and the ground voltage signal GND.

The control signal reception section 24 receives the differential signals dS1 to dSn of the LVDS transmit system transmitted from the control signal transmitter 13, differentially amplifies the received differential signals dS1 to dSn to convert them into serial control signals S1 to Sn, and outputs the converted serial control signals S1 to Sn to the control signal restoration section 25. The control signal reception section 24 receives the differential clock signal dClk of the LVDS transmit system transmitted from the control signal transmitter 13, differentially amplifies the received differential clock signal dClk to convert it into a clock signal Clk, and outputs the converted clock signal Clk to the control signal restoration section 25.

The control signal reception section 24 may receive differential signals dS1 to dSn and differential clock signals dClk of various high-speed transmit system such as LVDS, and also LVPECL, CML, and the like.

The control signal restoration section 25 generates a clock signal Sck, n print data signals SI1 to SIn, n latch signals LAT1 to LATn, and n change signals CH1 to CHn as a plurality of types of control signals for controlling the ejection of liquid from the ejection section 600, based on the serial control signals S1 to Sn converted by the control signal reception section 24. Specifically, the control signal restoration section 25 restores (deserializes) the original print data signal sSIi, the original latch signal sLATi, and the original change signal sCHi included in the serial control signal Si (i is any one of 1 to n) output from the control signal reception section 24 to generate the print data signal SIi, latch signal LATi, and change signal CHi, and output the resultant signals to the drive module 20-i. In addition, the control signal restoration section 25 performs a predetermined process (for example, a process of frequency dividing at a predetermined division ratio) on the clock signal Clk output from the control signal reception section 24, and generates a clock signal Sck synchronized with the print data signals SI1 to SIn, the latch signals LAT1 to LATn, and the change signals CH1 to CHn, and outputs the resultant signals to the n drive modules 20 (20-1 to 20-n).

The n drive modules 20 (20-1 to 20-n) have the same configuration and respectively have a selection controller 220, m selection sections 230, and m ejection sections 600. In the present embodiment, m is an integer equal to or greater than 600. The selection controller 220 is operated by a supply of the low power voltage signal LVDD and the ground voltage signal GND. In addition, the selection section 230 is operated by a supply of the high power voltage signal HVDD and the ground voltage signal GND.

In addition, in the drive module 20-i (i is any of 1 to n), the selection controller 220 instructs each of the selection sections 230 whether to select one of the drive signals COM-Ai and COM-Bi for each of the selection sections 230 (or not to select any), by the clock signal Sck, the print data signal SIi, the latch signal LATi and the change signal CHi output from the control signal restoration section 25.

Each of the selection sections 230 selects the drive signals COM-Ai and COM-Bi in accordance with the instruction from the selection controller 220 and outputs the selected signals to the corresponding ejection section 600 as the drive signal Vout which is applied to one end of the piezoelectric element 60 included in the ejection section 600. In addition, the reference voltage signal VBS is commonly applied to the other ends of all the piezoelectric elements 60.

The piezoelectric element 60 is provided correspondingly to each ejection section 600, and is displaced when a drive signal Vout (drive signals COM-Ai and COM-Bi) is applied. Then, the piezoelectric element 60 is displaced in accordance with the potential difference between the drive signal Vout (the drive signals COM-Ai and COM-Bi) and the reference voltage signal VBS to eject the liquid (ink). In this manner, in the drive module 20-i, the drive signal COM-Ai and the drive signal COM-Bi are exclusively selected and applied to one end of the piezoelectric element 60, and the reference voltage signal VBS is applied to the other end of the piezoelectric element 60 to drive the piezoelectric element 60, thereby ejecting the liquid. That is, the drive signals COM-Ai and COM-Bi are signals for driving each of the plurality of piezoelectric elements 60 to eject liquid.

The manner in which the drive signals COM-A1 to COM-An and COM-B1 to COM-Bn are specifically applied to one end of the piezoelectric element 60 by the print data signal SIi, the latch signal LATi, and the change signal CHi is not the feature of the invention, which will not be described in detail.

Figure 5:
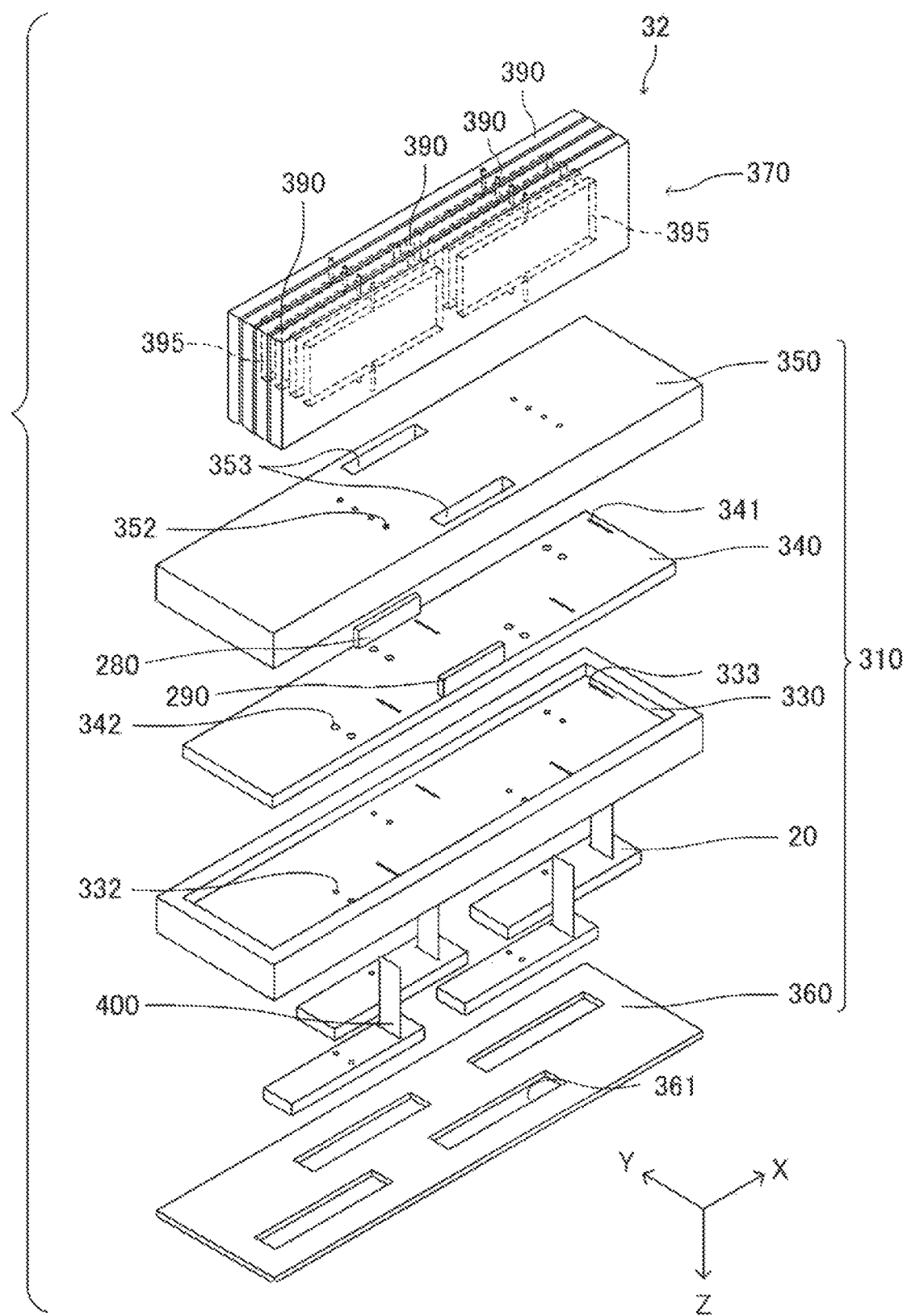
FIG. 5 is an exploded perspective view showing a configuration of a print head.

FIG. 5 is an exploded perspective view showing a configuration of a print head 32.

As shown in FIG. 5, the print head 32 includes a head main body 310 that ejects the ink as a liquid, and a flow path member 370 fixed to the head main body 310.

The head main body 310 includes n (4, in this example) drive modules 20, a holder 330 for holding the n drive modules 20, a second substrate 340 which is fixed to the holder 330, a supply member 350, and a fixing plate 360 for fixing the plurality of drive modules 20.

In the drive module 20, as shown in FIG. 3, a plurality of rows (two rows in this embodiment) in which nozzles 122 that eject the ink are juxtaposed in the X direction. A flexible wiring substrate 400 is led out on the surface on the opposite side in the Z direction from the surface on which the nozzles 122 of each of the drive modules 20 are provided, which is connected to a first substrate provided inside the drive module 20. Details of the first substrate will be described later with reference to FIGS. 6 and 10, and details of the flexible wiring substrate 400 will be described below in FIGS. 8 to 11A and 11B, respectively.

The holder 330 is provided with an accommodating portion (not shown) for accommodating the plurality of drive modules 20 on the side where the fixing plate 360 is provided in the Z direction. The accommodating portion has a concave shape opened to the side in the Z direction where the fixing plate 360 is provided and accommodates a plurality of drive modules 20 fixed to the fixing plate 360, and the opening of the accommodating portion is sealed by the fixing plate 360. That is, the drive modules 20 are accommodated inside the space formed by the accommodating portion and the fixing plate 360.

In addition, the holder 330 is provided with a communication flow path 332 for supplying the ink supplied from the supply member 350 to the drive module 20. Two communication flow paths 332 are provided for one drive module 20. That is, the communication flow path 332 is provided correspondingly to each row of the nozzles 122 provided in one drive module 20.

Further, the holder 330 is provided with wiring insertion holes 333 for inserting the flexible wiring substrates 400, which are electrically connected to the drive module 20 provided in the accommodating portion, into the surface provided with the accommodating portion in the Z direction and the other surface on the Z direction side. The flexible wiring substrates 400 are inserted through the wiring insertion holes 333 of the holder 330 to be led out from the space formed by the accommodating portion and the fixing plate 360.

The second substrate 340 is held on the side of the holder 330 from which the flexible wiring substrates 400 are led out. The second substrate 340 includes a drive wiring connection holes 341 penetrating in the Z direction which is a thickness direction, in which the flexible wiring substrates 400 are inserted through the drive wiring connection holes 341 of the second substrate 340 and bent to be electrically connected to second substrate 340.

The second substrate 340 is also provided with insertion holes 342 at positions corresponding to the communication flow paths 332 of the holder 330. Protrusions (not shown) provided in the supply member 350 are inserted into the insertion holes 342. The protrusions connect the supply member 350 to the communication flow paths 332 of the holder 330, thus allows the supply of the ink from the supply member 350 to the holder 330.

Further, a control signal connector 280 and a drive signal connector 290 are provided on both sides of the second substrate 340 in the Y direction, respectively. The second substrate 340 is electrically connected to the controller 10 through the flexible flat cables 190 and 191 (omitted in FIG. 5) shown in FIG. 4.

An IC (not shown) including the control signal reception section 24 and the control signal restoration section 25 in FIG. 4 is mounted on the second substrate 340, and the serial control signals S1 to Sn and the clock signal Clk input from the control signal connector 280 propagate through the wiring provided on the second substrate 340 and are input to the control signal reception section 24 of the IC. In addition, the control signals (the clock signal Sck, the print data signals SI1 to SIn, the latch signals LAT1 to LATn, and the change signals CH1 to CHn) restored by the control signal restoration section 25 of the IC are propagated through the wirings provided in the second substrate 340 and output to the first substrate in the drive module 20 through the flexible wiring substrate 400. In addition, the drive signals COM-A1 to COM-An and COM-B1 to COM-Bn, the high power voltage signal HVDD, the low power voltage signal LVDD, the reference voltage signal VBS, and the ground voltage signal GND input from the drive signal connector 290 are also propagated through the wiring provided on the second substrate 340 and output to the first substrate in the drive modules 20 through the flexible wiring substrates 400.

The supply member 350 is fixed to the holder 330 at the Z direction side. In addition, the supply member 350 is provided with supply flow paths 352 for supplying the ink supplied from the flow path member 370 to the communication flow paths 332 of the holder 330. The supply flow paths 352 are opened through both surfaces of the supply member 350 in the Z direction. The supply flow paths 352 may have a flow path extending in the X direction or the Y direction in depending on the positions of the flow path of the flow path member 370, the insertion holes 342 of the second substrate 340, and the communication flow paths 332 of the holder 330.

In addition, the supply member 350 is provided with through holes 353 penetrating in the Z direction at positions corresponding to the control signal connector 280 and the drive signal connector 290, respectively. That is, the flexible flat cables 190 and 191 in FIG. 4 are inserted through the through hole 353 of the supply member 350 in FIG. 5, and connected to the control signal connector 280 and the drive signal connector 290.

Opening 361 for exposing the nozzles 122 of each of the drive modules 20 are provided on the fixing plate 360 that closes the opening of the accommodating portion of the holder 330. The openings 361 in the present embodiment are provided independently for each drive module 20, and the space between the adjacent drive modules 20 is sealed by the fixing plate 360. In addition, the fixing plate 360 is fixed to the drive module 20 at the periphery of the opening 361.

The flow path member 370 is fixed to the supply member 350 side of the head main body 310 on the Z direction side. In the flow path member 370, a plurality of filter units 390 are stacked in the Y direction.

In addition, the filter unit 390 includes a plurality of flow paths 395 therein to remove air bubbles and foreign matter contained in the ink, and supplies the ink to the supply member 350 provided in the head main body 310.

The print head 32 supplies the ink supplied from the flow path member 370 to the drive modules 20 through the supply flow paths 352 and the communication flow paths 332 provided in the head main body 310. Then, the piezoelectric element 60 provided in the drive module 20-$i$ is driven based on the drive signals COM-A$i$ and COM-B$i$ described above, to eject the ink from the nozzle 122.

Figure 6:
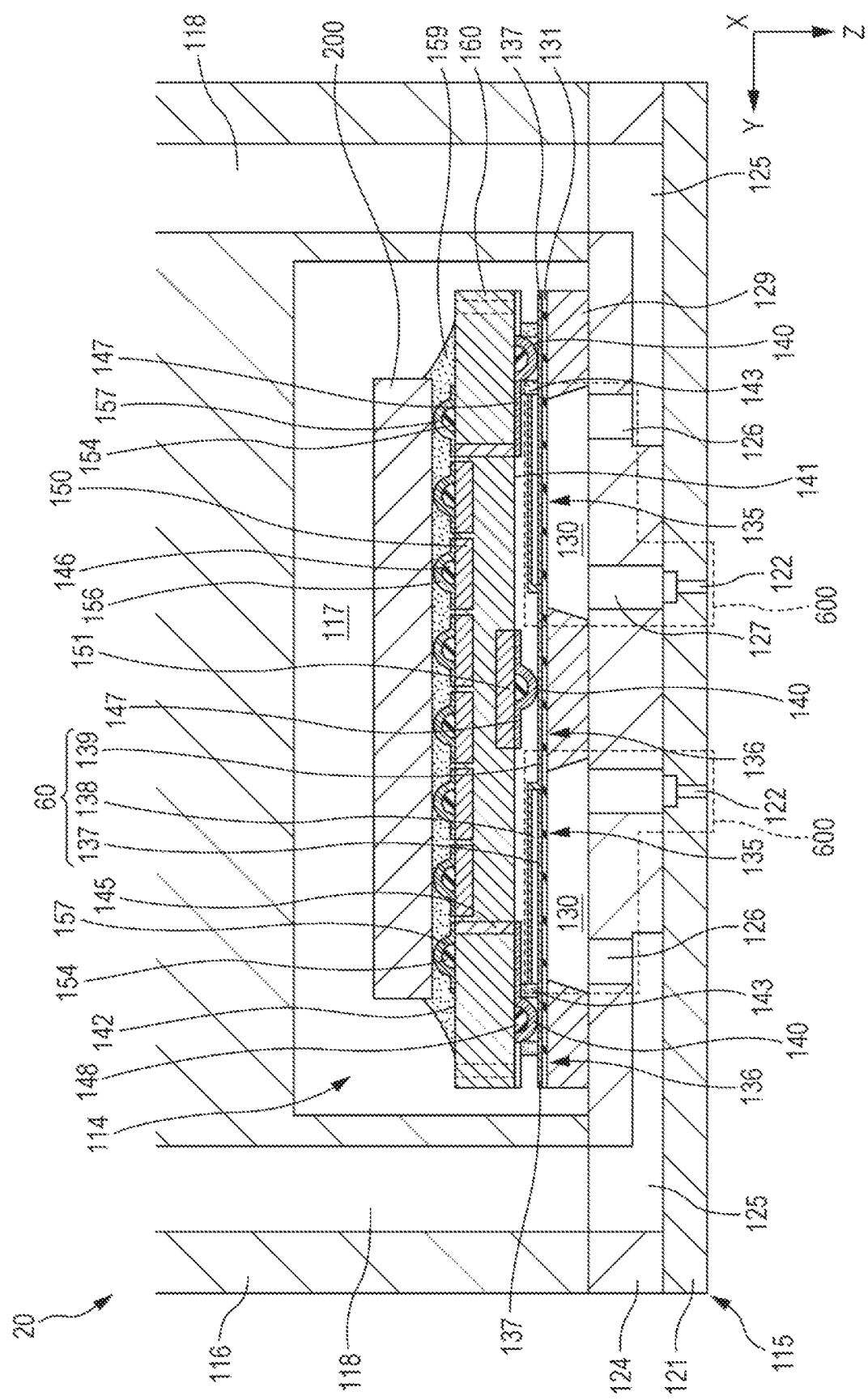
FIG. 6 is a cross-sectional view showing an internal structure of a drive module in a print head.

FIG. 6 is a cross-sectional view explaining an internal structure of the drive module 20.

As shown in FIG. 6, in a state in which an electronic device 114 and a flow path unit 115 are stacked, the drive module 20 is attached to the head case 116.

Reservoirs 118 for supplying the ink to the respective pressure chambers (cavities) 130 are formed inside the head case 116. The reservoirs 118 refer to spaces in which the common ink is stored in a plurality of juxtaposed pressure chambers 130, and two reservoirs 118 are formed correspondingly to both rows of the pressure chambers 130 which are juxtaposed in two rows. The reservoirs 118 communicate with the communication flow paths 332 in FIG. 5, and the ink is supplied to the reservoirs 118 through the communication flow paths 332. In addition, an accommodating space 117 is formed at a lower surface side of the head case 116, accommodating therein the electronic device 114 (the drive IC 200, the pressure chamber forming substrate 129, the first substrate 160, and the like) stacked on a communication substrate 124.

The flow path unit 115 includes the communication substrate 124 and a nozzle plate 121. The communication substrate 124 is provided with a common liquid chamber 125 which communicates with the reservoir 118 and in which common ink is stored in the respective pressure chambers 130, and individual communication paths 126 for individually supplying ink from the reservoirs 118 to the respective pressure chambers 130 through the common liquid chamber 125. The common liquid chamber 125 is an elongated empty space along the row direction of the nozzles and is formed in two rows corresponding to the rows of the pressure chambers 130 which are juxtaposed in two rows. In a thin plate portion of the common liquid chamber 125, a plurality of individual communication paths 126 are formed correspondingly to the pressure chambers 130 along the juxtapose direction of the corresponding pressure chambers 130. The individual communication paths 126 communicates with one end portion in a longitudinal direction of the corresponding pressure chamber 130 in a state in which the communication substrate 124 and the pressure chamber forming substrate 129 are joined together.

In addition, a nozzle communication path 127 penetrating the communication substrate 124 in the thickness direction is formed at a position corresponding to each of the nozzles 122 of the communication substrate 124. That is, a plurality of nozzle communication path 127 are formed along the row direction of the nozzles corresponding to the nozzle rows. The pressure chamber 130 and the nozzle 122 communicate with each other through the nozzle communication path 127. The nozzle communication path 127 communicates with an end portion on the other side (the side opposite to the individual communication path 126) in the longitudinal direction of the corresponding pressure chamber 130 in a state in which the communication substrate 124 and the pressure chamber forming substrate 129 are joined together.

The nozzle 122 is an opening formed in the nozzle plate 121. The nozzle plate 121 is a substrate joined to the lower surface (the surface of the side opposite to the pressure chamber forming substrate 129) of the communication substrate 124. For the nozzle plate 121, it is preferable to use silicon crystal such as silicon single crystal, silicon polycrystal, or the like. Among them, the nozzle plate 121 is more preferably a silicon single crystal. When the nozzle plate 121 is formed of silicon crystal, it is possible to perform machining with high accuracy by a known etching process (for example, wet etching or dry etching), and the nozzle 122 is formed by a combination of these. In the nozzle plate 121 formed of a silicon crystal, as compared with when the nozzle 122 is formed by punching or the like, the nozzles 122 can be formed at a higher density (e.g., nozzle density of 300 or more per inch).

Further, in the nozzle plate 121 formed of silicon crystal, it is easy to gradually change the opening diameter of the nozzle in order to enhance the ink ejection performance.

With this nozzle plate 121, the opening on the lower surface side of the space serving as the common liquid chamber 125 is sealed. In addition, in the nozzle plate 121, a plurality of nozzles 122 are formed linearly (in a line shape), and two nozzle rows are formed correspondingly to the rows of the pressure chambers 130 that are formed in two rows. The plurality of juxtaposed nozzles 122 (nozzle rows) are provided at a pitch corresponding to the dot formation density from the nozzle 122 on one end side to the nozzle 122 on the other end side, for example, at a pitch corresponding to a density of 300 or more per inch, and at substantially equal intervals along the X direction.

The electronic device 114 is a thin plate-shaped device that serves as an actuator that causes pressure fluctuation in the ink in each of the pressure chambers 130. In this electronic device 114, the pressure chamber forming substrate 129, a diaphragm 131, the piezoelectric element 60, the first substrate 160, and the drive IC 200 are stacked to form a unit. The drive IC 200 includes the selection controller 220 and m selection sections 230 (see FIG. 4).

In the pressure chamber forming substrate 129, a plurality of spaces to serve as the pressure chambers 130 are juxtaposed along the row direction of the nozzles. The lower side of the spaces is partitioned by the communication substrate 124 and the upper side is partitioned by the diaphragm 131 such that the pressure chamber 130 is formed. The pressure chambers 130 are formed in two rows correspondingly to the nozzle rows formed in two rows. Each of the pressure chambers 130 is an elongated empty space along a direction orthogonal to the row direction of the nozzles, and the individual communication path 126 communicates with one end portion in the longitudinal direction and the nozzle communication path 127 communicates with the other end portion.

The diaphragm 131 is a thin film member having elasticity and is laminated on the upper surface (the surface opposite to the communication substrate 124 side) of the pressure chamber forming substrate 129. The diaphragm 131 seals the upper opening of the space that will later serve as the pressure chamber 130. A portion of the diaphragm 131 corresponding to the upper opening of the pressure chamber 130 serves as a displacement portion that is displaced in a direction away from or close to the nozzle 122 in accordance with flexural deformation of the piezoelectric element 60. That is, the region corresponding to the upper opening of the pressure chamber 130 in the diaphragm 131 serves as the drive region 135 where flexural deformation is allowed. On the other hand, the rest region other than the upper opening of the pressure chamber 130 of the diaphragm 131 is a non-drive region 136 where flexural bending deformation is inhibited.

The piezoelectric elements 60 are laminated in the drive region 135, respectively. The piezoelectric elements 60 are formed in two rows along the row direction of the nozzles corresponding to the pressure chambers 130 juxtaposed in two rows along the row direction of the nozzles. In the piezoelectric element 60, for example, a lower electrode 137 (individual electrode), a piezoelectric layer 138, and an upper electrode 139 (common electrode) are sequentially stacked on the diaphragm 131. In the piezoelectric element 60 constructed as described above, a drive signal Vout is supplied to the lower electrode 137 which is the individual electrode, and a reference voltage signal VBS is supplied to the upper electrode 139 which is the common electrode, whereby an electric field corresponding to the potential difference between the two electrodes is applied between the lower electrode 137 and the upper electrode 139, resulting in flexural deformation in a direction away from or close to the nozzle 122.

The other end portion of the lower electrode 137 (the outer side in the longitudinal direction of the piezoelectric element 60) extends beyond the region where the piezoelectric layer 138 is stacked from the drive region 135 and to the non-drive region 136. Meanwhile, one end portion of the upper electrode 139 (the inner side in the longitudinal direction of the piezoelectric element 60) extends beyond the region where the piezoelectric layer 138 is stacked from the drive region 135 and to the non-drive region 136 between the rows of the piezoelectric elements 60.

In addition, the first substrate 160 is a flat plate-shape substrate disposed at a distance apart from the diaphragm 131 (or from the piezoelectric element 60). The first substrate 160 serves as a relay substrate for relaying various signals and also serves as a protective substrate for protecting the diaphragm 131 (or the piezoelectric element 60). A drive IC 200 for driving the piezoelectric element 60 is disposed on a second surface 142 (upper surface) opposite to the first surface 141 (lower surface) which is the surface of the first substrate 160 on the diaphragm 131 side. That is, in the first substrate 160, the diaphragm 131 having the piezoelectric element 60 laminated thereon is connected to the first surface 141 and the drive IC 200 is connected to the second surface 142.

The first surface 141 of the first substrate 160 includes a plurality of bump electrodes 140 for outputting a drive signal from the drive IC 200 to the piezoelectric element 60 side. A plurality of the bump electrodes 140 described above are respectively formed along the row direction of the nozzles, at a position corresponding to one lower electrode 137 (individual electrode) extended to the outside of one piezoelectric element 60, a position corresponding to the other lower electrode 137 (individual electrode) extended to the outside of the other piezoelectric element 60, and a position corresponding to the upper electrode 139 (common electrode) common to the plurality of piezoelectric elements 60 formed between the rows of the piezoelectric elements 60.

Each of the bump electrodes 140 is connected to a corresponding lower electrode 137 and upper electrode 139, respectively.

At least some of the bump electrode 140 are provided on the surface of the elastic resin layer 148. The resin layer 148 is formed as a protrusion along the row direction of the nozzles on the first surface 141 of the first substrate 160. A plurality of bump electrodes 140 electrically connected to the lower electrode 137 (individual electrode) are formed along the row direction of the nozzles corresponding to the piezoelectric elements 60 juxtaposed in the row direction of the nozzles. Each of the bump electrodes 140 extends from above the resin layer 148 to one of the piezoelectric element 60 side or the opposite side to the piezoelectric element 60 side to serve as a lower surface side wiring 147. An end portion of the lower surface side wiring 147 on the side opposite to the bump electrode 140 is connected to the through wiring 145.

A plurality of bump electrodes 140 corresponding to the upper electrode 139 are formed on a lower surface side buried wiring 151 buried in the first surface 141 of the first substrate 160 along the row direction of the nozzles. The bump electrodes 140 protrude from both sides of the resin layer 148 in the width direction of the resin layer 148 to form the lower surface side wiring 147, and is formed so as to be electrically connected to the lower surface side buried wiring 151. A plurality of bump electrodes 140 are formed along the row direction of the nozzles.

The first substrate 160 and the pressure chamber forming substrate 129 are joined with a photosensitive adhesive 143 in a state in which the bump electrode 140 is interposed therebetween. The photosensitive adhesive 143 is formed on both sides of each of the bump electrodes 140 in a direction orthogonal to the row direction of the nozzles. In addition, each of the photosensitive adhesives 143 is formed in a band shape along the row direction of the nozzles in a state of being separated from the bump electrodes 140.

On the second surface 142 of the first substrate 160, a plurality of upper surface side buried wirings 150 extending in the row direction of the nozzles are formed. Various types of constant voltage signals (high power voltage signal HVDD, low power voltage signal LVDD, ground voltage signal GND, and reference voltage signal VBS) and drive signals COM-Ai and COM-Bi are supplied to an upper surface side buried wiring 150 from the flexible wiring substrate 400 (see FIG. 5). A plurality of bump electrodes 156 are formed on each of the upper surface side buried wirings 150 along the row direction of the nozzles. At least some of the bump electrode 156 are provided on the surface of the elastic resin layer 146. The resin layer 146 is formed as a protrusion along the row direction of the nozzles on the second surface 142 of the first substrate 160. Each of the bump electrodes 156 is electrically connected to a wiring (not shown) inside the drive IC 200 through a terminal (not shown) of the drive IC 200. In addition, a plurality of wirings (not shown), to which various control signals (clock signals Sck 1 to CHn) are supplied from the flexible wiring substrate 400, are also formed on the second surface 142 of the first substrate 160 and are also electrically connected to the wiring inside the drive IC 200 through the terminals of the drive IC 200.

Further, bump electrodes 157, to which output signals (drive signals) are input from the drive IC 200, are formed in regions on both ends of the second surface 142 of the first substrate 160. At least some of the bump electrode 157 are provided on the surface of the elastic resin layer 154. The resin layer 154 is formed as a protrusion along the row direction of the nozzles on the second surface 142 of the first substrate 160. The bump electrode 157 is connected to the corresponding lower surface side wiring 147 through the through wiring 145.

The through wiring 145 is a wiring that relays between the first surface 141 and the second surface 142 of the first substrate 160. The through wiring 145 electrically connects the bump electrode 157 and the lower surface side wiring 147 extended from the bump electrode 140 corresponding thereto so that the drive signal from the drive IC 200 is transferred to the pressure chamber forming substrate 129. In this way, the first substrate 160 serves as a relay substrate that relays the drive signal from the drive IC 200 to the pressure chamber forming substrate 129.

The drive IC 200 is an IC chip for driving the piezoelectric element 60, and is stacked on the second surface 142 of the first substrate 160 with an adhesive 159. A plurality of input terminals (not shown) connected to the respective bump electrodes 156 are formed on the surface of the drive IC 200 on the side of the first substrate 160, and various constant voltage signals and drive signals COM-Ai and COM-Bi are transferred from the upper surface side buried wiring 150 provided on the first substrate 160 through the bump electrodes 156, or various control signals are transferred from a plurality of wirings (not shown) to each of the input terminals. In addition, a plurality of output terminals (not shown) connected to the respective bump electrodes 157 are formed on the surface of the drive IC 200 on the side of the first substrate 160, and a signal from each of the output terminals (individual drive signals for driving the respective piezoelectric elements 60) are transferred to the respective bump electrodes 157.

The drive IC 200 is an elongated chip in the row direction of the nozzles, in which, for example, the drive signals COM-Ai and COM-Bi transferred to the respective input terminals are transmitted through a wiring with small thickness and small length, which is provided inside the drive IC 200, and are supplied to each of the selection sections 230 (see FIG. 4) that outputs the individual drive signal Vout for driving each of the piezoelectric elements 60. Therefore, the resistance value between both ends of each of the internal wirings of the drive IC 200 is very large, and the drive signals COM-Ai and COM-Bi transferred through the respective internal wirings are attenuated (the voltage level decreases) under the influence of the voltage drop due to the wiring resistance, and as a result, the selection section 230 closer to the end is more apt to suffer malfunction. Therefore, the upper surface side buried wiring 150, which is sufficiently thicker and wider than the internal wiring of the drive IC 200, is also used as a reinforcing wiring of each of the internal wirings of the drive IC 200. That is, each of the upper surface side buried wirings 150 is provided in parallel with each of the internal wirings of the drive IC 200 and each signal is transferred to each of the input terminals of the drive IC 200 through each of the upper surface side buried wirings 150 and a plurality of bump electrodes 156 formed on the upper surface side buried wiring 150 along the row direction of the nozzles. As a result, for example, the voltage drop of the drive signals COM-Ai and COM-Bi supplied to each of the selection sections 230 is reduced, and the selection section 230 close to the end of the drive IC 200 is less likely to malfunction.

Two rows of bump electrodes 157 are formed on both sides of the bump electrodes 156 correspondingly to the rows of the piezoelectric elements 60 juxtaposed in two rows, and in the row of the bump electrodes 157, distance between the centers (that is, pitch) of the adjacent bump electrodes 157 (the pitch of the output terminals of the drive IC 200) is formed to be smaller than the pitch of the bump electrodes 140 (the pitch of the nozzles 122). That is, the first substrate 160 also serves to absorb the difference between the pitch of the output terminals of the drive IC 200 and the pitch of the nozzles 122, whereby the size of the drive IC 200 can be reduced.

Then, the drive module 20 formed as described above introduces the ink into the pressure chamber 130 from the liquid storage 4 through the ink introduction path, the reservoir 118, the common liquid chamber 125, and the individual communication path 126. In this state, the drive signal from the drive IC 200 is supplied to the piezoelectric element 60 through the respective wirings formed in the first substrate 160, whereby the piezoelectric element 60 is driven to cause pressure variation in the pressure chamber 130. By utilizing this pressure fluctuation, the drive module 20 ejects the ink from the nozzle 122 through the nozzle communication path 127.

The ejection section 600 in FIG. 4 includes the piezoelectric element 60, the diaphragm 131, the pressure chamber 130, the individual communication path 126, the nozzle communication path 127, and the nozzle 122 in FIG. 6.

Figure 8:
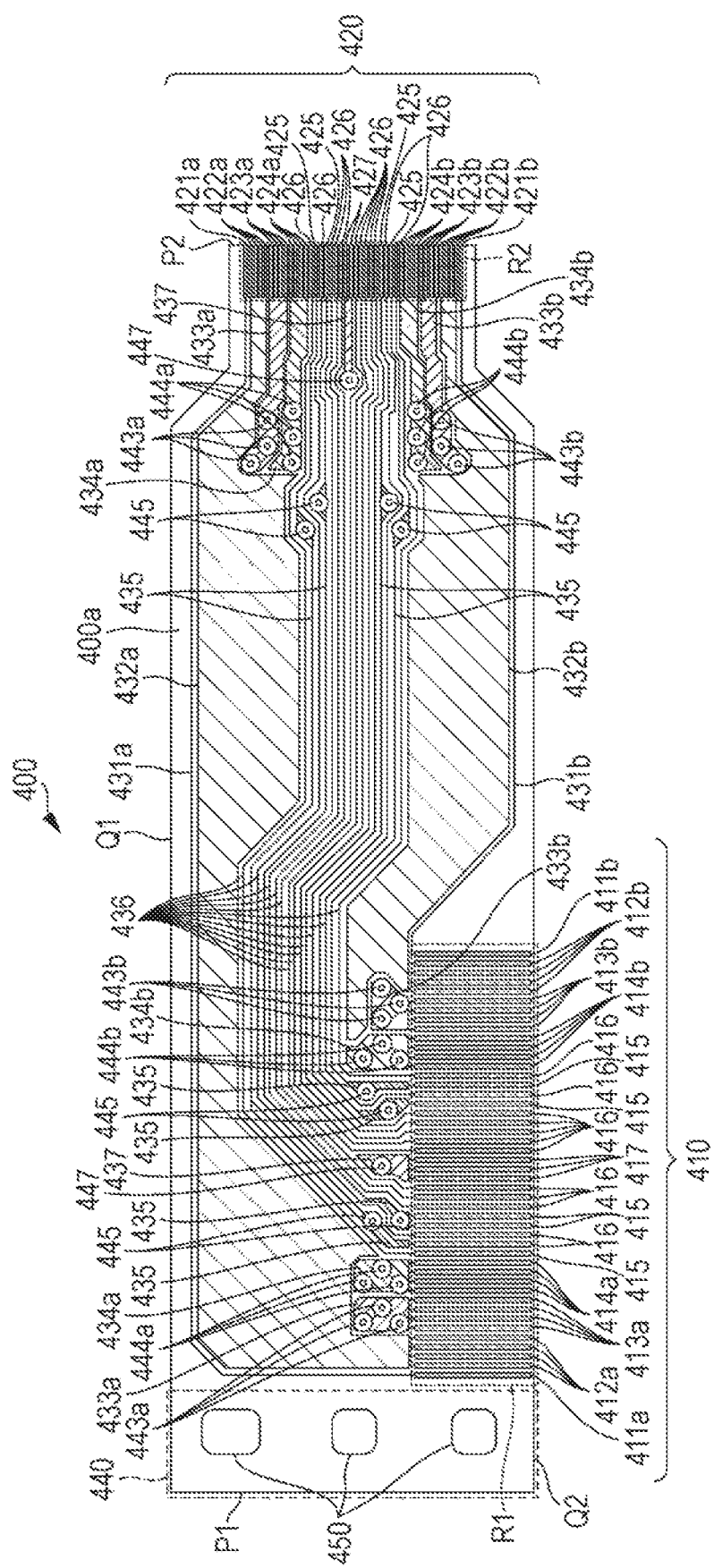
FIG. 8 is a plan view showing a first surface in a flexible wiring substrate.
Figure 9:
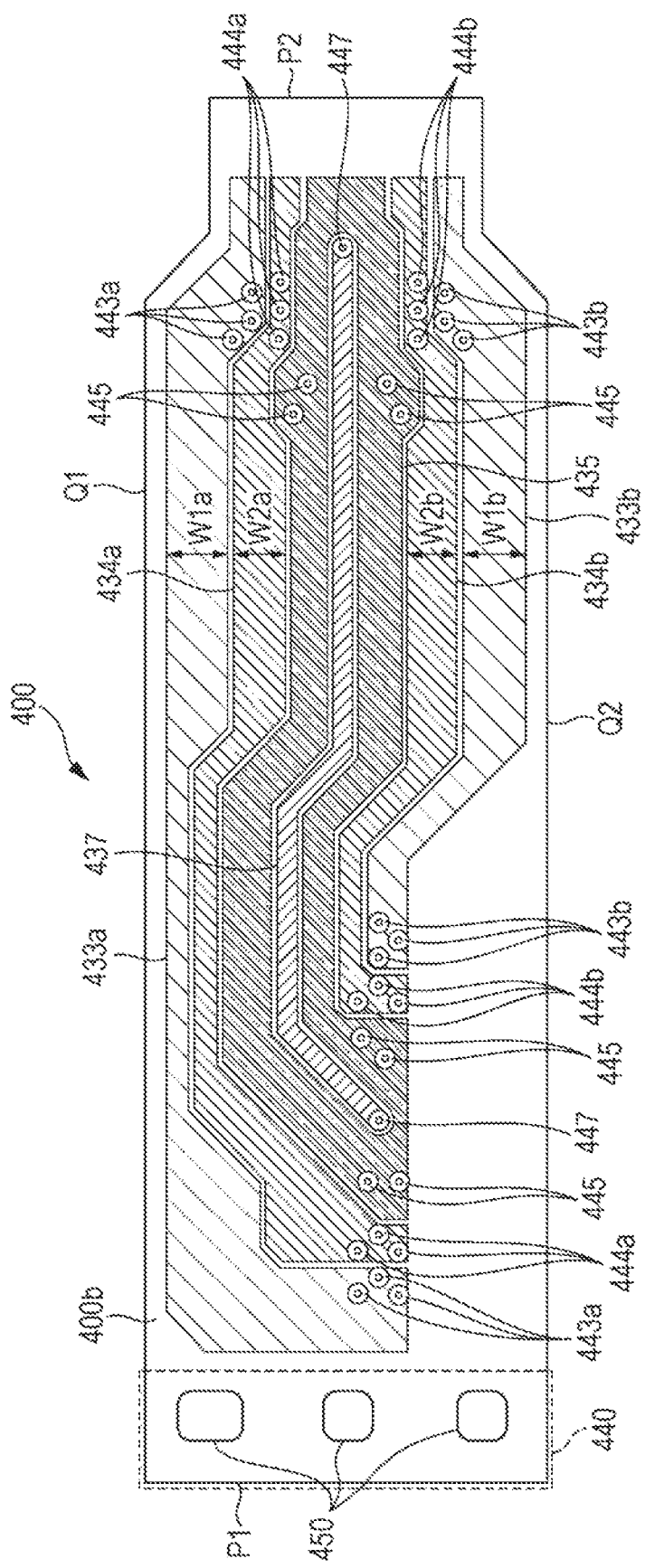
FIG. 9 is a plan view showing a second surface of a flexible wiring substrate seen from the first surface.
Figure 10:
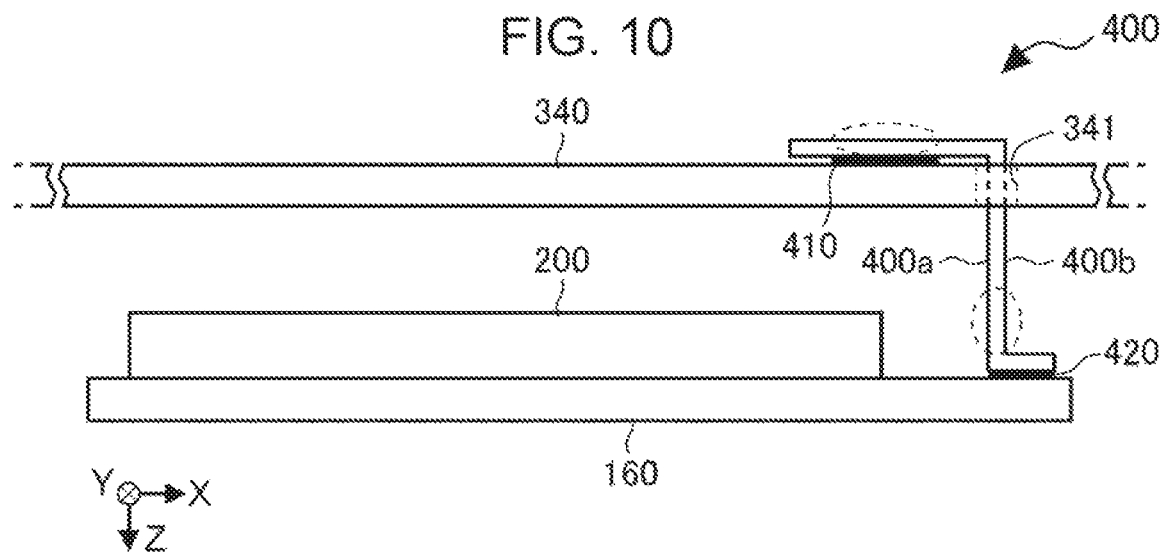
FIG. 10 is a view showing a state in which a first substrate and a second substrate are connected to a flexible wiring substrate.

Next, the configuration of the flexible wiring substrate 400 will be described with reference to FIGS. 7 to 10. FIG. 7 is a perspective view of the flexible wiring substrate 400. FIG. 8 is a plan view of the first surface 400a of the flexible wiring substrate 400. In addition, FIG. 9 is a plan view showing the second surface 400b of the flexible wiring substrate 400 viewed from the first surface 400a side. In addition, FIG. 10 is a view showing the flexible wiring substrate 400, and the second substrate 340 of the print head 32 (see FIG. 5) and the first substrate 160 of the drive module 20 (see FIG. 6) in a state of being connected to each other.

As shown in FIG. 7, the flexible wiring substrate 400 has high flexibility and can be easily bent and also held in the bent shape. The flexible wiring substrate 400 may include, for example, a liquid crystal polymer as a base as described below, and is a double-sided substrate having wirings provided on both surfaces of the first surface 400a and the second surface 400b.

Although not shown in FIG. 7, the flexible wiring substrate 400 has a through hole (a via) for electrically connecting the first surface 400a and the second surface 400b, and a portion of the wirings provided on the first surface 400a and a portion of the wirings provided on the second surface 400b are electrically connected to each other through the through hole. As described above, the flexible wiring substrate 400 having wirings on both sides can be made smaller in size than the single-sided wiring substrate, which is advantageous for miniaturizing the print head 32.

In addition, although it is not visually recognizable in FIG. 7, an input terminal group 410 and an output terminal group 420 are provided on the first surface 400a as shown in FIG. 8, and the first surface 400a side is connected to the first substrate 160 of the second substrate 340 and the drive module 20.

As shown in FIG. 8, in a plan view of the flexible wiring substrate 400, the input terminal group 410 is provided on the first surface 400a of the flexible wiring substrate 400 along a longer side Q2 of the flexible wiring substrate 400. The input terminal group 410 includes input terminals 411a and 411b to which the high power voltage signal HVDD is input, input terminals 412a and 412b to which the reference voltage signal VBS is input, input terminals 413a and 413b to which the drive signal COM-Ai (i is any of 1 to n) is input, input terminals 414a and 414b to which the drive signal COM-Bi is input, and input terminals 415 to which the ground voltage signal GND is input. In addition, the input terminal group 410 includes input terminals 416 to which various control signals (clock signal Sck, print data signals SI1 to SIn, latch signals LAT1 to LATn, and change signals CH1 to CHn) are input, and input terminals 417 to which the low power voltage signal LVDD is input. Each of the input terminals included in the input terminal group 410 is connected to each of the output terminals (not shown) provided in the second substrate 340 in the region R1 of the first surface 400a (see FIG. 10).

In addition, as shown in FIG. 8, provided on the first surface 400a of the flexible wiring substrate 400 are high power voltage signal transmit wirings 431a and 431b for transmitting the high power voltage signal HVDD, reference voltage signal transmit wirings 432a and 432b for transmitting the reference voltage signal VBS, first drive signal transmit wirings 433a and 433b for transmitting the drive signal COM-Ai, and second drive signal transmit wirings 434a and 434b for transmitting the drive signal COM-Bi. In addition, ground voltage signal transmit wirings 435 for transmitting the ground voltage signal GND, control signal transmit wirings 436 for transmitting various control signals, and low power voltage signal transmit wirings 437 for transmitting the low power voltage signal LVDD are provided on the first surface 400a of the flexible wiring substrate 400.

The high power voltage signal transmit wiring 431a is electrically connected to an input terminal 411a, and the high power voltage signal transmit wiring 431b is electrically connected to an input terminal 411b. The reference voltage signal transmit wiring 432a is electrically connected to the input terminal 412a, and the reference voltage signal transmit wirings 432b is electrically connected to the input terminal 412*b*. The first drive signal transmit wiring 433*a* is electrically connected to the input terminal 413*a*, and the first drive signal transmit wiring 433*b* is electrically connected to the input terminal 413*b*. The second drive signal transmit wiring 434*a* is electrically connected to the input terminal 414*a* and the second drive signal transmit wiring 434*b* is electrically connected to the input terminal 414*b*. The ground voltage signal transmit wirings 435 are electrically connected to the input terminals 415, the control signal transmit wirings 436 are electrically connected to the input terminals 416, and the low power voltage signal transmit wirings 437 are electrically connected to the input terminals 417.

In addition, as shown in FIG. 8, an output terminal group 420 is provided along a shorter side P2 different from the longer side Q2 provided with the input terminal group 410, on the first surface 400*a* of the flexible wiring substrate 400 in the plan view of the flexible wiring substrate 400. That is, the input terminal group 410 and the output terminal group 420 are disposed on the same surface of the flexible wiring substrate 400. The output terminal group 420 includes output terminals 421*a* and 421*b* for outputting the high power voltage signal HVDD, output terminals 422*a* and 422*b* for outputting the reference voltage signal VBS, output terminals 423*a* and 423*b* for outputting the drive signal COM-Ai, output terminals 424*a* and 424*b* for outputting the drive signal COM-Bi, and output terminals 425 for outputting the ground voltage signal GND. In addition, the output terminal group 420 includes output terminals 426 for outputting various control signals (clock signal Sck, print data signals SI1 to SIn, latch signals LAT1 to LATn, and change signals CH1 to CHn) and output terminals 427 for outputting the low power voltage signal LVDD. Each of the output terminals included in the output terminal group 420 is connected to each of the input terminals (not shown) provided in the first substrate 160 of the drive module 20 in the region R2 of the first surface 400*a* (see FIG. 10).

In this way, the input terminal group 410 and the output terminal group 420 are disposed on the same surface of the flexible wiring substrate 400, so that the input terminal group 410 and the second substrate 340 are connected to each other and the output terminal group 420 and the first substrate 160 are connected to each other in the print head 32 where the second substrate 340 and the first substrate 160 are stacked, which results in reduced use of the space for connection and reduced size of the flexible wiring substrate 400. Thus, miniaturization of the print head 32 is realized.

The output terminal 421*a* is electrically connected to the high power voltage signal transmit wiring 431*a* and outputs the high power voltage signal HVDD to the drive module 20. In addition, the output terminal 421*b* is electrically connected to the high power voltage signal transmit wiring 431*b*, and outputs the high power voltage signal HVDD to the drive module 20. The output terminal 422*a* is electrically connected to the reference voltage signal transmit wiring 432*a*, and outputs the reference voltage signal VBS to the drive module 20. In addition, the output terminal 422*b* is electrically connected to the reference voltage signal transmit wiring 432*b*, and outputs the reference voltage signal VBS to the drive module 20. The output terminal 423*a* is electrically connected to the first drive signal transmit wiring 433*a* and outputs the drive signal COM-Ai to the drive module 20. In addition, the output terminal 423*b* is electrically connected to the first drive signal transmit wiring 433*b*, and outputs the drive signal COM-Ai to the drive module 20. The output terminal 424*a* is electrically connected to the second drive signal transmit wiring 434*a*, and outputs the drive signal COM-Bi to the drive module 20. In addition, the output terminal 424*b* is electrically connected to the second drive signal transmit wiring 434*b*, and outputs the drive signal COM-Bi to the drive module 20. The output terminal 425 is electrically connected to the ground voltage signal transmit wiring 435, and outputs the ground voltage signal GND to the drive module 20. The output terminal 426 is electrically connected to the control signal transmit wiring 436, and outputs various control signals to the drive module 20. The output terminal 427 is electrically connected to the low power voltage signal transmit wiring 437 and outputs the low power voltage signal LVDD to the drive module 20.

The high power voltage signal HVDD output from the output terminal 421*a*, the drive signal COM-Ai output from the output terminal 423*a*, and the drive signal COM-Bi output from the output terminal 424*a* are supplied to the selection section 230 corresponding to each of the nozzles (ejection section 600) included in one (first nozzle row) of two rows of nozzle rows provided in the drive module 20. In addition, the high power voltage signal HVDD output from the output terminal 421*b*, the drive signal COM-Ai output from the output terminal 423*b*, and the drive signal COM-Bi output from the output terminal 424*b* are supplied to the selection section 230 corresponding to each of the nozzles (ejection section 600) included in the other (second nozzle row) of two nozzle rows provided in the drive module 20. That is, the output terminals 423*a* and 424*a* are electrically connected to one end of the piezoelectric element 60 included in each of the ejection section 600 provided correspondingly to the first nozzle row, and the output terminals 423*b* and 424*b* are electrically connected to one end of the piezoelectric element 60 included in each of the ejection sections 600 provided correspondingly to the second nozzle row.

The reference voltage signal VBS output from the output terminal 422*a* is supplied to the ejection section 600 that ejects liquid from each of the nozzles included in the first nozzle row. In addition, the reference voltage signal VBS output from the output terminal 422*b* is supplied to the ejection section 600 that ejects liquid from each of the nozzles included in the second nozzle row. That is, the output terminal 422*a* is electrically connected to the other end of the piezoelectric element 60 included in each of the ejection sections 600 provided correspondingly to the first nozzle row, and the output terminal 422*b* is electrically connected to the other end of the piezoelectric element 60 included in each of the ejection sections 600 provided correspondingly to the second nozzle row.

The ground voltage signal GND output from the output terminal 425, the various control signals output from the output terminal 426, and the low power voltage signal LVDD output from the output terminal 427 are commonly supplied to all the selection controllers 220.

Each of the transmit wirings is a wiring formed by copper plating (copper plating wiring), for example, and is covered with a resist (protective film). In addition, each of the input terminals included in the input terminal group 410 and each of the input terminals included in the output terminal group 420 are not covered with a resist, that is, for example, a portion of the transmit wiring formed by copper plating is further formed by gold plating. In this manner, each of the transmit wirings, each of the input terminals, and each of the output terminals have high flexibility since they do not have a hard metal such as nickel as a material, and contribute to connecting the second substrate 340 and the drive module 20 in a space-saving manner.

As shown in FIG. 9, first drive signal transmit wirings 433a and 433b for transmitting the drive signal COM-Ai and second drive signal transmit wirings 434a and 434b for transmitting the drive signal COM-Bi, ground voltage signal transmit wirings 435 for transmitting the ground voltage signal GND, and low power voltage signal transmit wirings 437 for transmitting the low power voltage signal LVDD are provided on the second surface 400b of the flexible wiring substrate 400.

The first drive signal transmit wirings 433a and 433b provided on the second surface 400b are connected to the first drive signal transmit wirings 433a and 433b provided on the first surface 400a through the through holes 443a and 443b, respectively. Therefore, the first drive signal transmit wiring 433a provided on the second surface 400b and the input terminal 413a and the output terminal 423a provided on the first surface 400a are electrically connected through the through hole 443a, and the first drive signal transmit wiring 433b provided on the second surface 400b and the input terminal 413b and the output terminal 423b provided on the first surface 400a are electrically connected through the through hole 443b. Similarly, the second drive signal transmit wirings 434a and 434b provided on the second surface 400b are connected to the second drive signal transmit wirings 434a and 434b provided on the first surface 400a through the through holes 444a and 444b, respectively. Therefore, the second drive signal transmit wiring 434a provided on the second surface 400b and the input terminal 414a and the output terminal 424a provided on the first surface 400a are electrically connected through the through hole 444a, and the second drive signal transmit wiring 434b provided on the second surface 400b and the input terminal 414b and the output terminal 424b provided on the first surface 400a are electrically connected through the through hole 444b.

Similarly, the ground voltage signal transmit wiring 435 and the low power voltage signal transmit wiring 437 provided on the second surface 400b are connected to the ground voltage signal transmit wirings 435 and the low power voltage signal transmit wiring 437 provided on the first surface 400a through the through holes 445 and 447, respectively. Therefore, the ground voltage signal transmit wiring 435 provided on the second surface 400b and the input terminal 415 and the output terminal 425 provided on the first surface 400a are electrically connected through the through hole 445, and the low power voltage signal transmit wiring 437 provided on the second surface 400b and the input terminal 417 and the output terminal 427 provided on the first surface 400a are electrically connected through the through hole 447.

As shown in FIGS. 8 and 9, the through hole 443a is provided in the vicinity of the input terminal 413a or the output terminal 423a, and the through hole 443b is provided in the vicinity of the input terminal 413b or the output terminal 423b.

Similarly, the through hole 444a is provided in the vicinity of the input terminal 414a or the output terminal 424a, and the through hole 444b is provided in the vicinity of the input terminal 414b or the output terminal 424b. Similarly, the through hole 445 is provided in the vicinity of the input terminal 415 or the output terminal 425, and the through hole 447 is provided in the vicinity of the input terminal 417 or the output terminal 427. That is, each of the through holes is provided in the vicinity of the input terminal group 410 or the output terminal group 420 and is not provided in the vicinity of the center of the flexible wiring substrate 400. As a result, the area of each of the first drive signal transmit wirings 433a and 433b, the second drive signal transmit wirings 434a and 434b, the ground voltage signal transmit wiring 435 and the low power voltage signal transmit wiring 437 provided on the second surface 400b of the flexible wiring substrate 400 is increased, and the wiring impedance of each of the transmit wirings is reduced.

As shown in FIG. 10, in the flexible wiring substrate 400, when the input terminal group 410 is connected to the second substrate 340 and the output terminal group 420 is connected to the first substrate 160, a portion close to the regions R1 and R2 (see FIG. 8) to which the input terminal group 410 and the output terminal group 420 are respectively connected is bent. In the present embodiment, each of the through holes provided in the flexible wiring substrate 400 is provided in a non-bent region (region indicated by a broken line in FIG. 10) of the flexible wiring substrate 400, so that external load due to bending are not applied to each of the through holes. Therefore, it is possible to reduce the possibility of occurrence of failure such as ejection failure due to conduction failure such as disconnection, short of the conductor, or the like in each of the through holes.

In addition, as described above, the flexible wiring substrate 400 applied in the present embodiment is held in its bent shape without being restored when bent. For this reason, the flexible wiring substrate 400 can be joined to the first substrate 160 and the second substrate 340, respectively, in a state of being held in minutely bent state, which allows assembling with high precision.

In particular, as shown in FIG. 10, the flexible wiring substrate 400 applied in the present embodiment is bent at two positions, that is, at the vicinity of a connection portion to the first substrate 160 and at the vicinity of a connection portion to the second substrate 340, which facilitates the three-dimensional connection, thereby increases the density of the print head 32. There may be other than two bending positions.

Figure 11A:
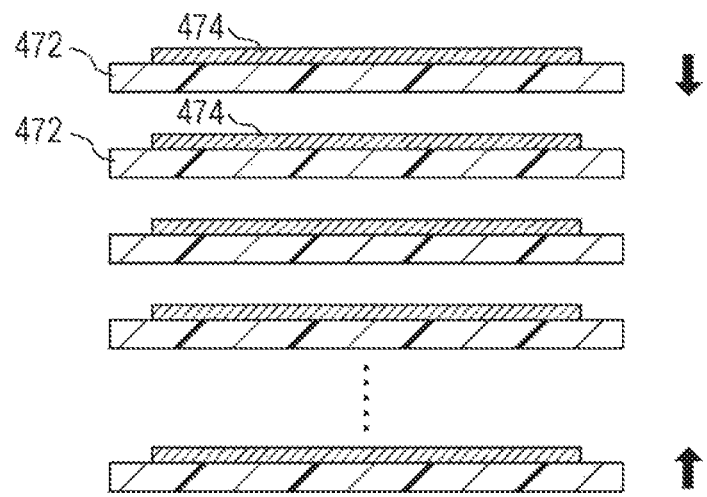
FIGS. 11A and 11B are cross-sectional views showing a structure of a flexible wiring substrate according to an embodiment.
Figure 11B:
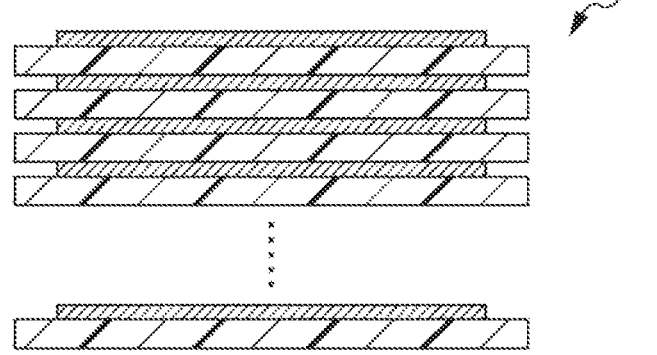

FIGS. 11A and 11B are cross-sectional views showing the structure and the like of the flexible wiring substrate 400, and also showing the manufacturing process. The flexible wiring substrate 400 applied in the present embodiment is manufactured as shown in FIGS. 11A and 11B. Specifically, as shown in FIG. 11A, a plurality of bases 472 and a plurality of wirings 474 patterned on one surface of the bases 472 are stacked and pressed together (thermocompression bonding). By this pressing, as shown in FIG. 11B, the bases 472 and the wirings 474 are alternately laminated. For the base (an example of "nonconductive resin") 472 of the flexible wiring substrate 400, a nonconductive resin sheet having a low dielectric constant and a low dielectric dissipation factor is used. For such a base 472, liquid crystal polymer is suitable, for example. In addition, the wiring (an example of "conductive metal") 474 is obtained by etching a conductive layer of copper or the like formed on the surface of the base 472 using photolithography, for example.

In the flexible wiring substrate 400 applied in the present embodiment, since it is laminated by thermocompression bonding without using chemicals or the like in the manufacturing process, it is hardly affected by corrosion of the wiring 474, ejected ink, or the like.

Figure 12A:
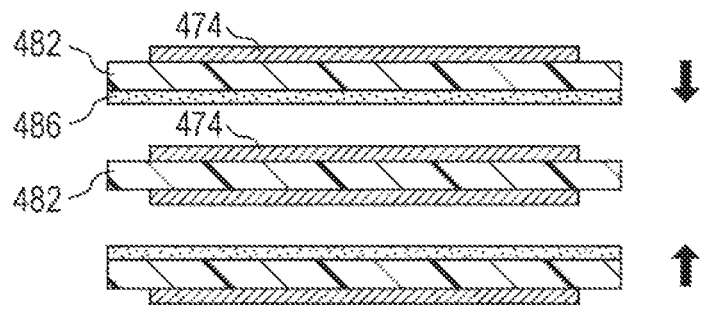
FIGS. 12A to 12C are cross-sectional views showing a structure and others of a related art wiring substrate.
Figure 12B:
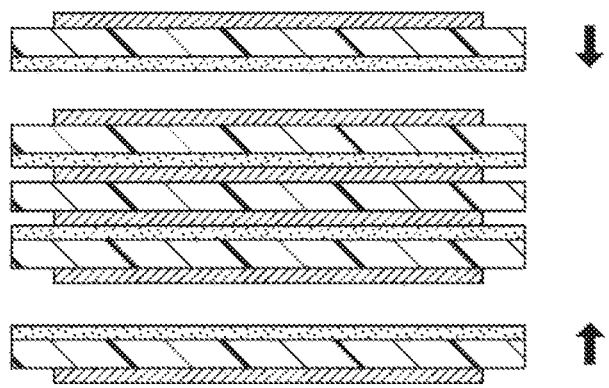
Figure 12C:
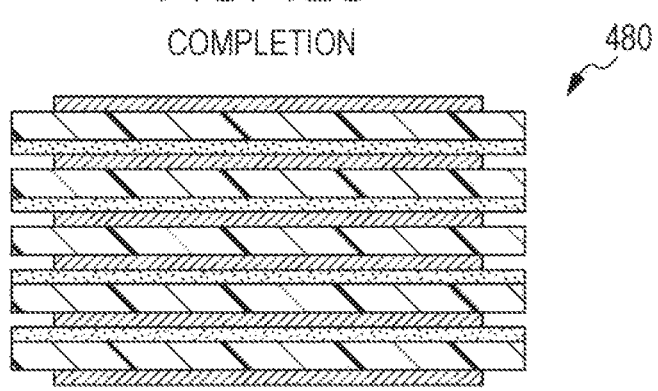

FIGS. 12A to 12C are cross-sectional views showing the structure and the like of a related art wiring substrate 480 using polyimide for the base 482, and also showing the manufacturing process. The related art wiring substrate 480 is manufactured as shown in FIGS. 12A, 12B and 12C. Specifically, as shown in FIG. 12A, a plurality of bases 482 having the wiring 474 patterned on one surface and the adhesive layer 486 including the adhesive provided on the other surface are laminated and bonded (primary lamination). Next, as shown in FIG. 12B, this process is repeated a plurality of times until the number of laminated sheets reaches the required number (secondary lamination).

As a result, as shown in FIG. 12C, the structure of the related art wiring substrate 480 has a structure in which the base 482 and the wiring 474 are laminated with the adhesive layer 486 interposed therebetween.

In the related art wiring substrate 480, since the adhesive layer 486 is present between the base 482 and the wiring 474, by that amount, the thickness increases and the high frequency characteristic deteriorates. In addition, in the related art wiring substrate 480, when the pressing is uneven, the thickness of the adhesive layer 486 may be varied in some cases. Furthermore, in the related art wiring substrate 480, there is a drawback that the adhesive layer 486 is susceptible to the influence of the ink mist generated by the ejection of the ink.

On the other hand, unlike the related art wiring substrate 480, the flexible wiring substrate 400 applied in the present embodiment omits the adhesive layer 486, and accordingly, there is an advantage that thinning and thickness uniformity can be achieved, with excellent high frequency characteristics, and there is also reduced susceptibility to the influence of the ink mist.

The fact that the thinning can be achieved can be led into ability to ensure the thickness of the wiring layer increased as much. In the print head 32 in which the nozzles 122 are densely aligned, since the piezoelectric elements 60 are also increased in proportion to the increase of the ejection section 600, the amount of current (electric power) of the drive signals COM-Ai and COM-Bi supplied to the first substrate 160 of the print head 32 also increases. When enough thickness is not ensured in the wiring layer, the wiring resistance is increased and loss occurs. However, since the thickness of the wiring layer (conductor cross-sectional area) can be secured in the flexible wiring substrate 400 applied in the present embodiment, it is possible to keep the wiring resistance to be small.

In addition, the fact that the uniformity of the thickness can be achieved means that variations in the wiring resistance of the first substrate 160 and the second substrate 340, particularly, the wiring resistance at the junction, can be reduced. As a result, variations in the drive signals supplied to the individual piezoelectric elements 60 are reduced, resulting in an increase in accuracy, thereby enabling high-definition printing.

To describe the enhanced high frequency characteristics in detail, the waveform accuracy of the drive signal supplied to each of the piezoelectric elements 60 is enhanced, which enables high-definition printing.

To describe less susceptibility to the influence by the ink mist in detail, this means, in other words, various reactive inks can be used as the ink in the present embodiment. Here, the "reactive ink" means an ink used when the medium S does not have an ink receiving layer such as vinyl chloride or polyethylenes, in which an ink-dissolving component is mixed such that the component reacts with the medium S to fix the colorant contained in the ink. When the wiring substrate 480 having the related art adhesive layer 486 is used, there is an adverse effect such that the adhesive is dissolved and the adhesive surface is peeled off due to the influence of the ink mist generated by the ejection, but since the flexible wiring substrate 400 applied in this embodiment does not include an adhesive layer (adhesive), it is possible to print on a wide variety of media S using a wide range of reactive inks compared with the related art wiring substrate 480.

The flexible wiring substrate 400 shown in FIGS. 5 and 7 to 10 is a double-sided substrate in which wirings are provided on both surfaces of the first surface 400a and the second surface 400b, but it is still possible to obtain the effect of holding the flexible wiring substrate 400 in the bent state. In addition, when the flexible wiring substrate 400 has three or more wiring layers, it is possible to benefit from the effect of the absence of the adhesive layer.

Figure 13:
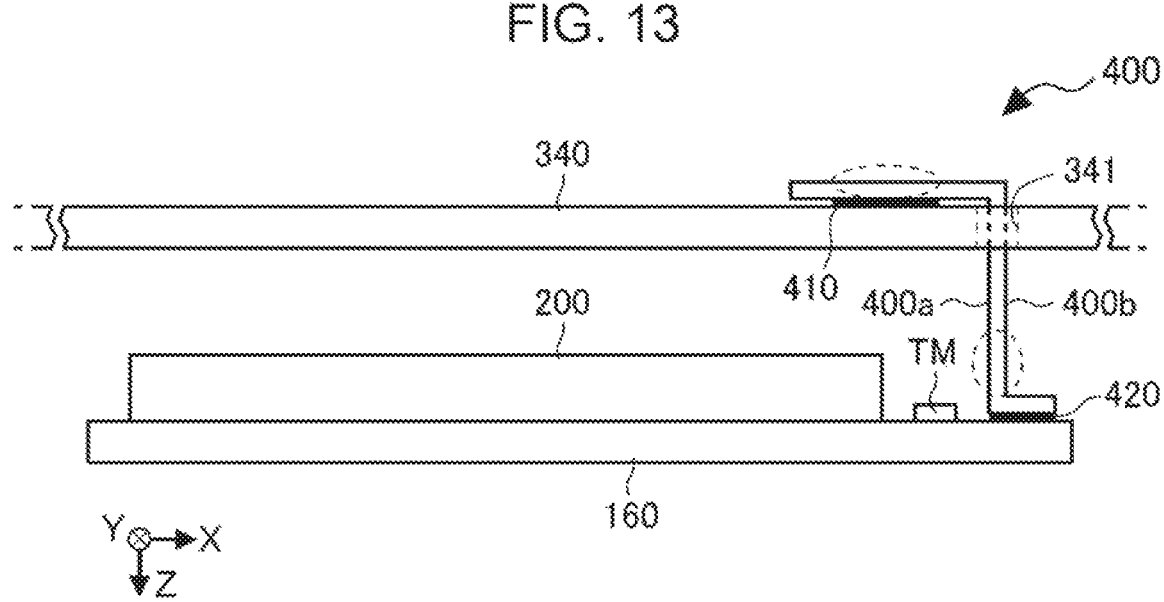
FIG. 13 is a view showing a flexible wiring substrate according to an example in a connected state.

FIG. 13 is a view showing an application example of the flexible substrate 400.

In FIG. 13, the flexible wiring substrate 400 is different from FIG. 10 in that a temperature sensor TM is mounted on the first substrate 160, while the flexible wiring substrate 400 is similar to the one in FIG. 10 in that the input terminal group 410 is connected to the second substrate 340 and the output terminal group 420 is connected to the first substrate 160. The temperature sensor TM is, for example, a thermistor whose internal resistance value changes due to a change in temperature, and detects the temperature of the periphery of the first substrate 160, specifically, the temperature in the vicinity of the ejection section 600 (particularly, the ink filled in the piezoelectric element 60 and the pressure chamber 130). The output signal of the temperature sensor TM is supplied to the second substrate 340 through the first substrate 160 and the flexible wiring substrate 400 and is further supplied to the controller 10 from the second substrate 340 through the flexible flat cable 190 (or 191).

The drive data generator 14 in the controller 10 corrects and generates the drive data that defines the drive signals COM-Ai and COM-Bi based on the output signal of the temperature sensor TM, so as to cancel the change in the temperature characteristic of the piezoelectric element 60, the change in the physical properties of the ink caused by the temperature, and the like. By this correction, it is possible to enhance the precision of ink ejection from the ejection section 600.

As described above, in the flexible wiring substrate 400, since the influence of the wiring resistance and the mutual inductance can be reduced with good frequency characteristics, the output signal of the temperature sensor TM can be supplied accurately to the control module as compared with the related art wiring substrate 480.

In the first embodiment described above, a line head type ink jet printer is exemplified as the liquid ejecting apparatus, but the liquid ejecting apparatus is not limited to the line head type. Next, a description will be given of a so-called serial type ink jet printer in which the print head is mounted on a carriage reciprocating along the X direction.

Figure 14:
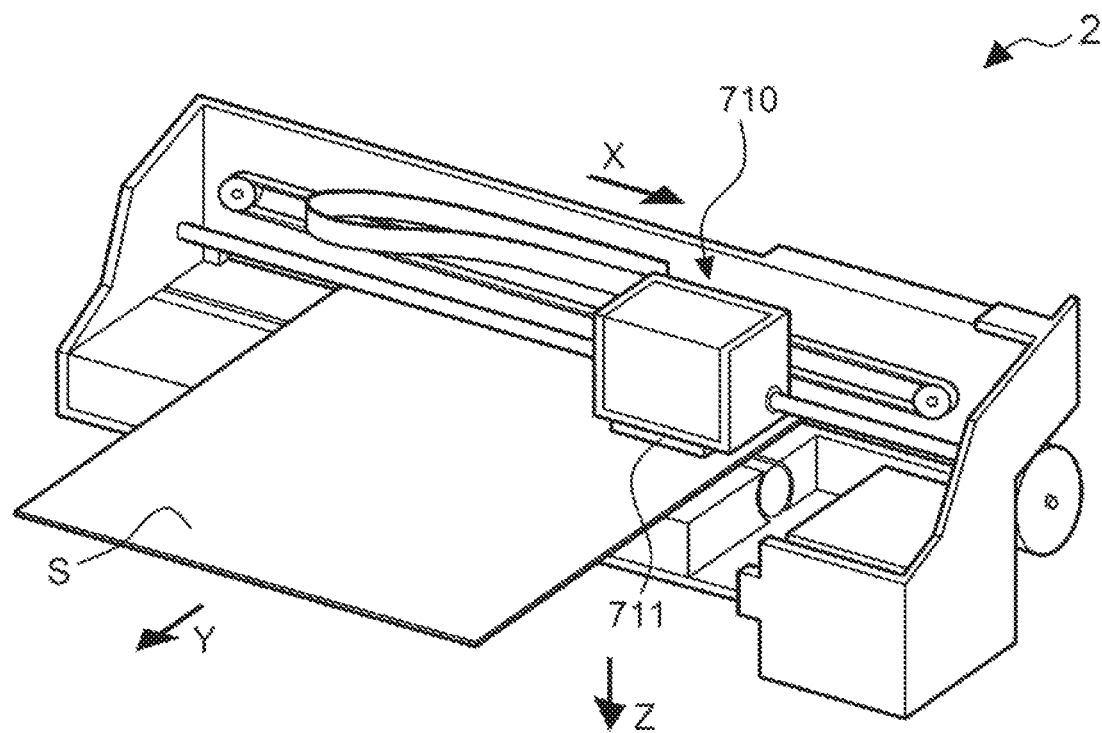
FIG. 14 is a perspective view showing a configuration of a liquid ejecting apparatus according to a second embodiment.

FIG. 14 is a perspective view showing a configuration of the liquid ejecting apparatus 2 according to the second embodiment.

As shown in this drawing, in the liquid ejecting apparatus 2, a carriage 710 carrying the print head 711 reciprocates in a main scanning direction (X direction) substantially orthogonal to a sub-scanning direction (Y direction) in which the medium S is transported, and the ink is ejected in accordance with this main scanning.

Figure 15:
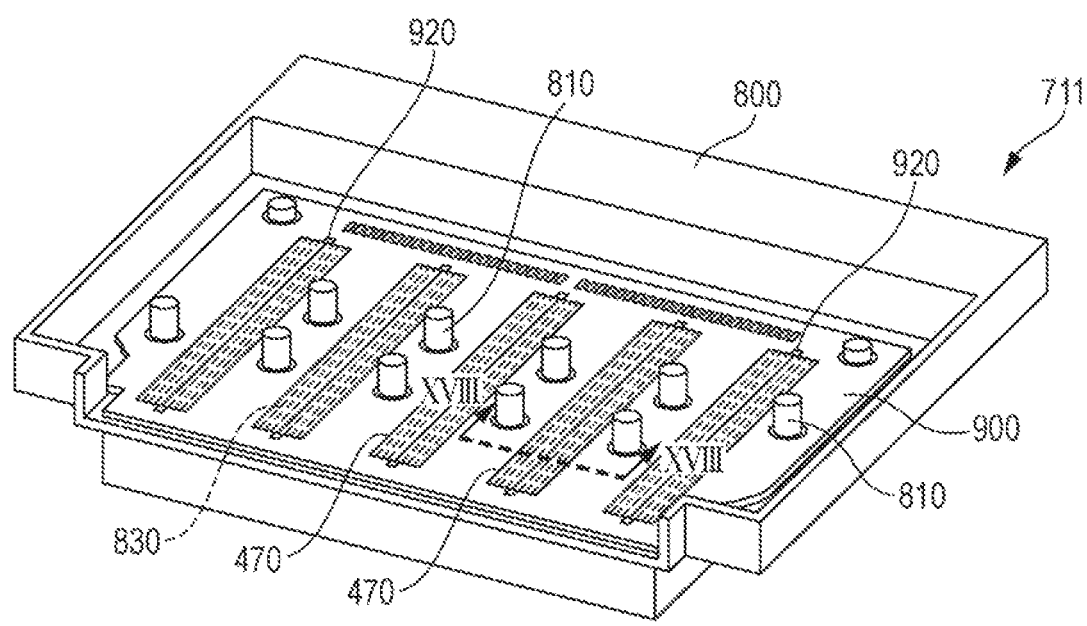
FIG. 15 is a perspective view showing a configuration of a print head in a liquid ejecting apparatus.
Figure 16A:
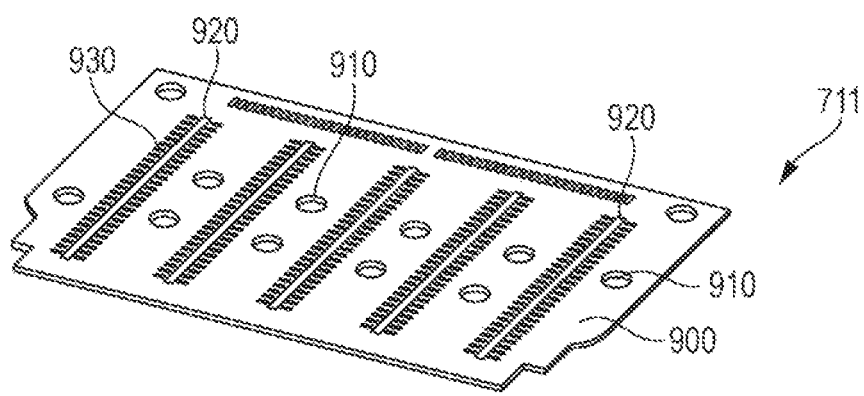
FIGS. 16A to 16C are exploded perspective views showing a configuration of a print head.
Figure 16B:
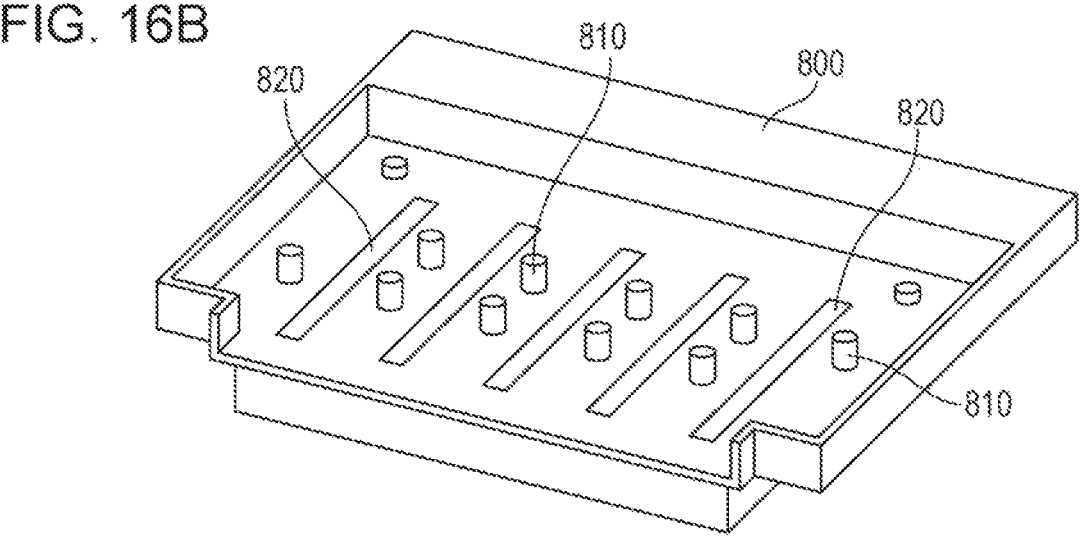
Figure 16C:
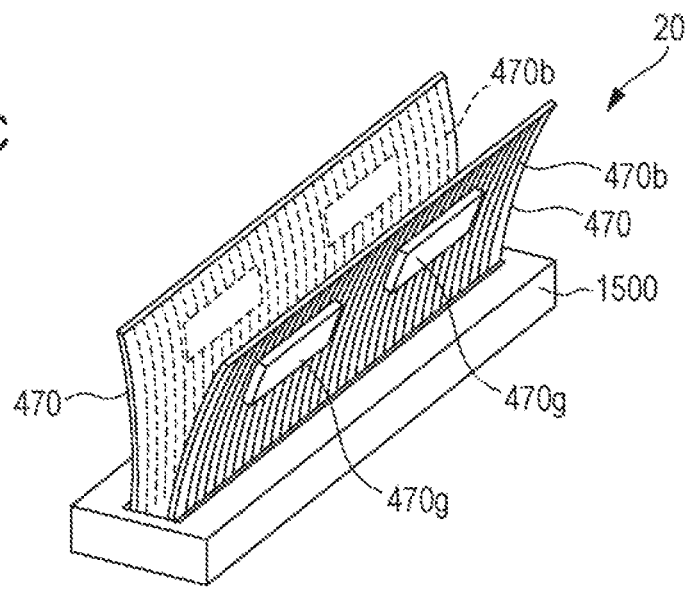

FIG. 15 is a perspective view of the print head 711 applied to the liquid ejecting apparatus 2, and FIGS. 16A to 16C are exploded perspective views of the print head 711.

As shown in FIGS. 16A to 16C, the print head 711 includes five drive modules 20. In addition, as shown in FIGS. 15 and 16A to 16C, the print head 711 includes a holder member 800 and a second substrate 900.

Ten ink introduction paths 810 are formed correspondingly to the five drive modules 20 in the holder member 800. In addition, holes 910, through which the ink introduction path 810 passes, are formed in the second substrate 900. The second substrate 900 is fitted into the holder member 800 from one side of the holder member 800, with an ink introduction path 810 being passed through the hole 910.

In addition, the drive module 20 includes a case head 1500 and a flexible wiring substrate 470 on which an IC chip 470g is mounted by chip on film (COF) technology. The IC chip 470g includes functions of the selection controller 220, the selection section 230, and the like.

The print head 711 is inserted into the holder member 800 from the side opposite to the side where the second substrate 900 is fitted. Slits 820 serving as openings are formed at five positions corresponding to the inserted print head 711 in the holder member 800 and five slits 920 serving as openings are formed in the second substrate 900.

A pair of flexible wiring substrates 470 are passed through the slit 820 and the slit 920, and the wiring 470b of the flexible wiring substrate 470 is joined to the terminal 930 of the second substrate 900, respectively.

Figure 18:
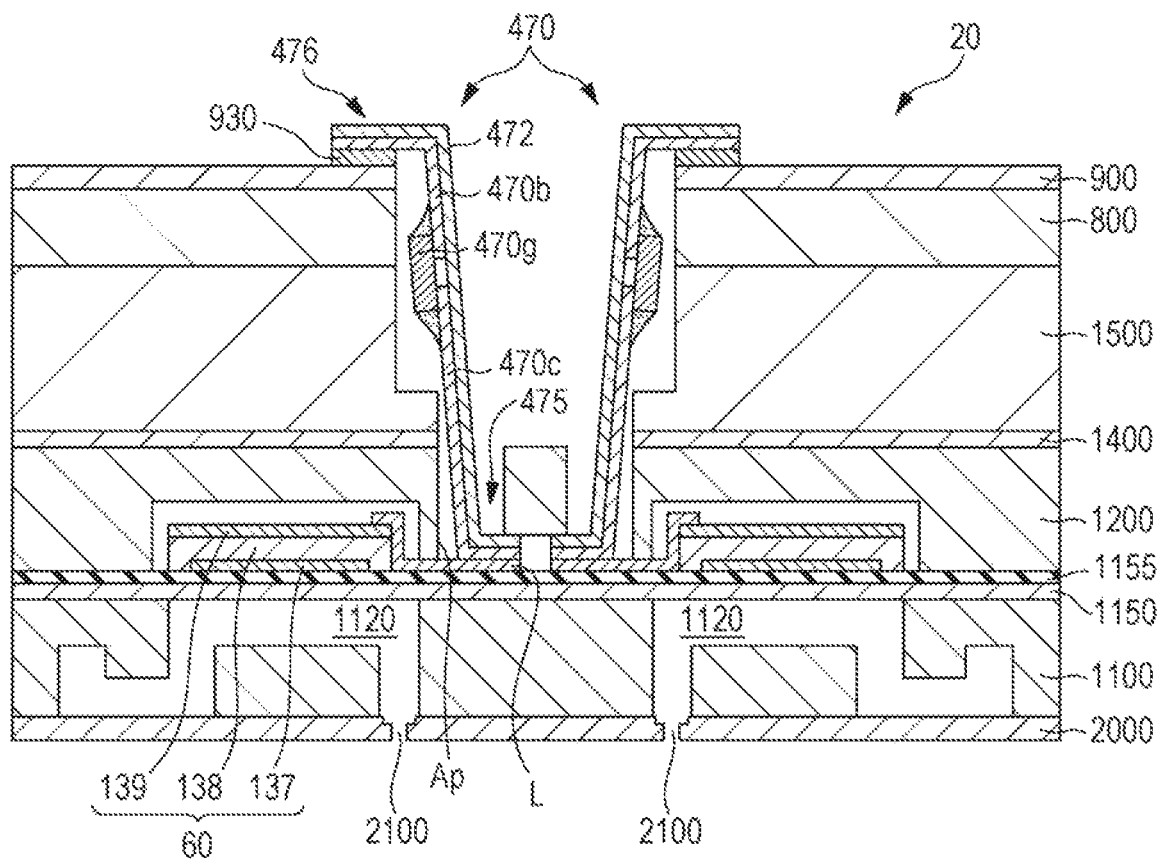
FIG. 18 is a cross-sectional view showing an internal structure of a drive module.

FIG. 17 is a partially exploded perspective view of the drive module 20 according to the second embodiment, showing a state before being incorporated in the holder member 800 and the second substrate 900. FIG. 18 is a schematic cross-sectional view taken along the line XVIII-XVIII of the print head 711 in FIG. 15.

As shown in FIG. 17, the drive module 20 includes a pair of flexible wiring substrates 470 in which the flow path forming substrate 1100, the nozzle plate 2000, the protective substrate 1200, the compliance substrate 1400, and the IC chip 470g (two in the examples of FIGS. 16A to 16C and 17) are mounted.

The flow path forming substrate 1100 is stacked so as to be pinched between the nozzle plate 2000 and the protective substrate 1200, and the compliance substrate 1400 is provided on the protective substrate 1200.

Likewise the nozzle plate 121 in the first embodiment, it is preferable to use a silicon crystal such as a silicon single crystal, silicon polycrystal, or the like for the nozzle plate 2000 according to the second embodiment.

The flexible wiring substrate 470 includes a first end 475 and a second end 476 located on the opposite side of the first end 475. The first end 475 of the flexible wiring substrate 470 is plugged into the protective substrate 1200 while the second end 476 is connected to the second substrate 900.

In the flow path forming substrate 1100, two rows of pressure chambers 1120 partitioned by partition walls are provided as rows juxtaposed in the width direction. Here, the pressure chambers 1120 are provided in pairs. Although not specifically shown, the pressure chamber 1120 is filled with the ink supplied through the ink introduction path 810.

An elastic film 1150 is formed on the side opposite to the opening plane of the flow path forming substrate 1100 (upper side in FIG. 18), and an insulating film 1155 is formed on this elastic film 1150. Further, a lower electrode (individual electrode) 137, a piezoelectric layer 138, and an upper electrode (common electrode) 139 are sequentially stacked to constitute a piezoelectric element 60 on the insulating film 1155.

One end of the lead electrode L is connected to the upper electrode 139 and the other end of the lead electrode L is exposed at the bottom of the opening Ap formed in the protective substrate 1200.

In addition, although not shown in FIG. 18, the lower electrode 137 in the piezoelectric element 60 is extended to the opening Ap by patterning and is exposed together with a lead electrode L at the bottom of the opening Ap.

The lead electrode L exposed at the opening Ap and the lower electrode 137 in each of the piezoelectric elements 60 are electrically connected to the wiring 470c of the flexible wiring substrate 470 inserted into the opening Ap, in particular, the wiring 470c formed at the first end 475, respectively, by an anisotropic adhesive (not shown), for example. As a result, each of the piezoelectric elements 60 is driven by the IC chip 470g mounted on the flexible wiring substrate 470.

In this way, the piezoelectric element 60 is formed in the flow path forming substrate 1100, and the wiring 470a of the flexible wiring substrate 470 is joined to the lead electrode L and the lower electrode 137 led to the piezoelectric element 60, respectively. Therefore, in the second embodiment, the flow path forming substrate 1100 serves as the first substrate.

The second end 476 located on the opposite side of the first end 475 of the flexible wiring substrate 470 is passed through the slit 820 of the holder member 800 and the slit 920 of the second substrate 900 and the wiring 470b at the second end 476 is joined to the terminal 930 of the second substrate 900.

Liquid crystal polymer, for example, is also used for the base 472 in the flexible wiring substrate 470 applied in the second embodiment, likewise the flexible wiring substrate 400 applied in the first embodiment. In the flexible wiring substrate 470, each of the first end 475 and the second end 476 is bent in an L shape, but since the reaction force is suppressed, it can be easily positioned at the time of joining with the terminal 930 in the second substrate 900 and joining with the lead electrode L and the lower electrode 137 in the flow path forming substrate 1100 which serves as the second substrate. Therefore, the print head 711 can be assembled with high accuracy.

In addition, the flexible wiring substrate 470 has an advantage that thinning and thickness uniformity can be achieved, high frequency characteristics are good, and it is less likely to be influenced by ink mist, likewise the flexible wiring substrate 400.

What is claimed is:

1. A print head comprising:
   a drive module having 600 or more piezoelectric elements aligned at a density of 300 or more per inch for ejecting liquid, and a first substrate;
   a second substrate; and
   a flexible wiring substrate connecting the first substrate and the second substrate,
   wherein the flexible wiring substrate is a multilayer substrate including a stack of a plurality of alternating layers of a conductive metal and layers of a nonconductive resin that are laminated by pressure bonding, the nonconductive resin being a liquid crystal polymer.

2. The print head according to claim 1,
   wherein the flexible wiring substrate is formed by laminating the layers of conductive metal and the layers of nonconductive resin without using an adhesive.

3. The print head according to claim 1,
   wherein the flexible wiring substrate is a multilayer substrate in which the nonconductive resin is pressure bonded by heat.

4. The print head according to claim 2,
   wherein the liquid is a reactive ink.

5. The print head according to claim 1,
   wherein the flexible wiring substrate connects the first substrate and the second substrate in a bent state.

6. The print head according to claim 5,
wherein the flexible wiring substrate is bent a plurality of times.

7. The print head according to claim 5,
wherein the first substrate includes a temperature sensor, and
the flexible wiring substrate transmits information of the temperature sensor to the second substrate.

8. The print head according to claim 1,
wherein the second substrate supplies electric power for driving the piezoelectric elements, and
the flexible wiring substrate transmits the electric power.

* * * * *